(12) United States Patent
Ozawa et al.

(10) Patent No.: US 11,373,674 B2
(45) Date of Patent: Jun. 28, 2022

(54) RECORDING DEVICE, READING DEVICE, RECORDING METHOD, RECORDING PROGRAM, READING METHOD, READING PROGRAM, AND MAGNETIC TAPE

(71) Applicant: FUJIFILM CORPORATION, Tokyo (JP)

(72) Inventors: Eiki Ozawa, Kanagawa (JP);
Michitaka Kondo, Kanagawa (JP);
Kentaro Miyamoto, Kanagawa (JP);
Naoki Sano, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 0 days.

(21) Appl. No.: 17/393,404

(22) Filed: Aug. 4, 2021

(65) Prior Publication Data

US 2021/0383826 A1 Dec. 9, 2021

Related U.S. Application Data

(63) Continuation of application No. PCT/JP2020/001095, filed on Jan. 15, 2020.

(30) Foreign Application Priority Data

Mar. 13, 2019 (JP) .............................. JP2019-045624

(51) Int. Cl.
*G11B 5/706* (2006.01)
*G11B 5/71* (2006.01)
(Continued)

(52) U.S. Cl.
CPC .......... *G11B 5/00813* (2013.01); *G11B 5/708* (2013.01); *G11B 5/71* (2013.01); *G11B 5/735* (2013.01); *G11B 5/78* (2013.01)

(58) Field of Classification Search
CPC ....... G11B 5/00813; G11B 5/78; G11B 5/708; G11B 5/70678; G11B 5/582; G11B 5/714;
(Continued)

(56) References Cited

U.S. PATENT DOCUMENTS 10,811,048 B2 * 10/2020 Ozawa ............... G11B 5/70684
2010/0323222 A1 12/2010 Nakashio et al.
2015/0055241 A1 2/2015 Abe et al.

FOREIGN PATENT DOCUMENTS

JP H05-282796 A 10/1993
JP 2008-217558 A 9/2008
(Continued)

OTHER PUBLICATIONS

International Search Report issued in International Application No. PCT/JP2020/001095 dated Mar. 24, 2020.
(Continued)

*Primary Examiner* — Nabil Z Hindi
(74) *Attorney, Agent, or Firm* — Solaris Intellectual Property Group, PLLC

(57) ABSTRACT

An information processing device includes a generation unit that generates a hierarchy of a group that classifies each piece of data from information about each of a plurality of pieces of data to be recorded, and a control unit that controls recording of the plurality of pieces of data included in a group of the hierarchy at a highest level on a magnetic recording medium in a recording order according to an order from an upper hierarchy to a lower hierarchy, for each group of the hierarchy at the highest level. The magnetic recording medium has a magnetic layer containing a ferromagnetic powder and a binding agent on a non-magnetic support. A difference between spacings $S_{0.5}$ and $S_{13.5}$ measured under pressures of 0.5 atm and 13.5 atm by an optical interference
(Continued)

method after n-hexane cleaning on a surface of the magnetic layer is equal to or less than 3.0 nm.

19 Claims, 8 Drawing Sheets

(51) Int. Cl.
G11B 5/008 (2006.01)
G11B 5/708 (2006.01)
G11B 5/735 (2006.01)
G11B 5/78 (2006.01)

(58) Field of Classification Search
CPC ..... G11B 5/7356; G11B 5/00817; G11B 5/66; G11B 5/845; G11B 5/70; G11B 5/73927
USPC .......................................................... 428/828
See application file for complete search history.

(56) References Cited

FOREIGN PATENT DOCUMENTS

| | | |
|---|---|---|
| JP | 2011-28826 A | 2/2011 |
| JP | 2013-222489 A | 10/2013 |
| JP | 2014-003388 A | 1/2014 |
| JP | 2015-041389 A | 3/2015 |
| JP | 2015-179560 A | 10/2015 |
| JP | 2017-168178 A | 9/2017 |
| JP | 2018-181396 A | 11/2018 |

OTHER PUBLICATIONS

Written Opinion of the ISA issued in International Application No. PCT/JP2020/001095 dated Mar. 24, 2020.

* cited by examiner

| PATIENT NAME (PATIENT A) | | | | | | PATIENT NAME (PATIENT B) | ... |
|---|---|---|---|---|---|---|---|
| DIAGNOSIS DATE (7/1/2018) | | | DIAGNOSIS DATE (8/1/2018) | | ... | ... | ... |
| MEDICAL IMAGE | | DIAGNOSIS INFORMATION | MEDICAL IMAGE | | DIAGNOSIS INFORMATION | ... | ... |
| CT | MRI | | CT | MRI | | | |
| OBJECT→ | | | | | | ... | ... |

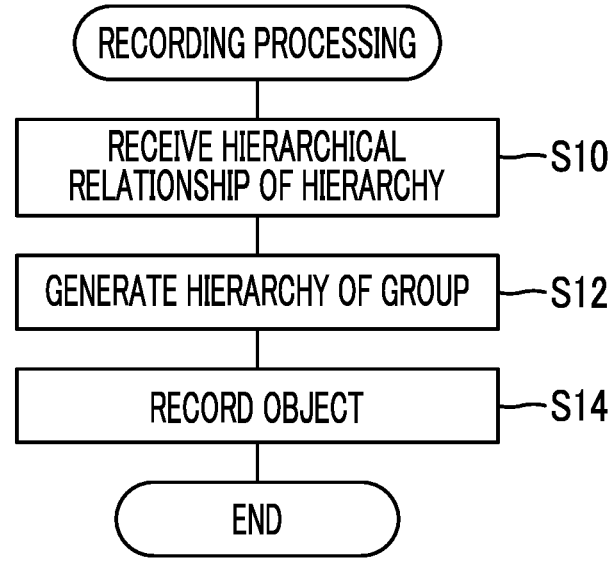
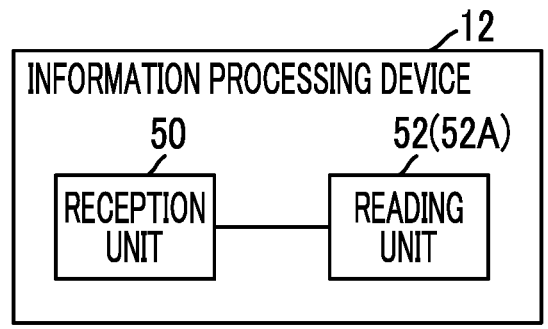
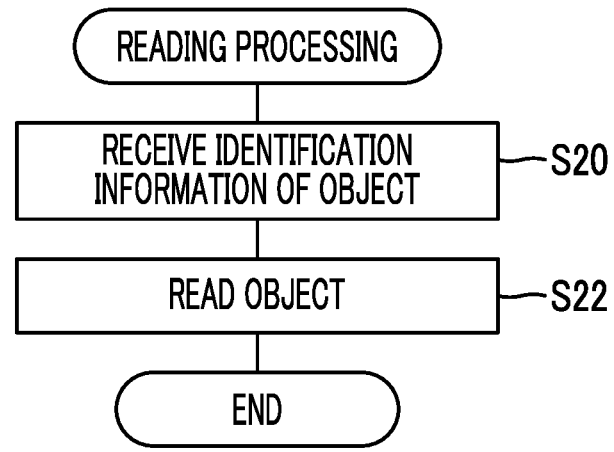

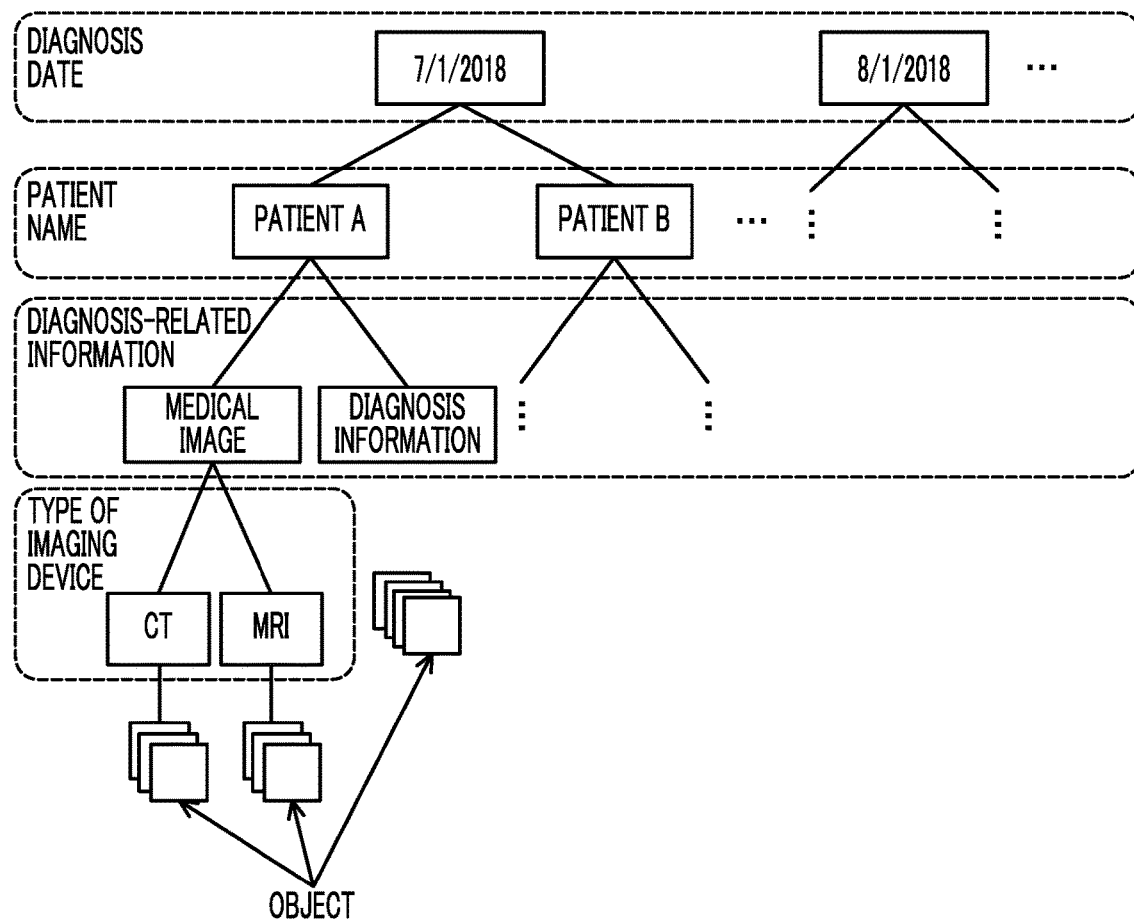

FIG. 14

| | PROJECTION FORMING AGENT | CALENDER TEMPERATURE(°C) | RECORDING CONTROL | $S_{0.5}$ (nm) | $S_{13.5}$ (nm) | $S_{0.5}-S_{13.5}$ (nm) | μ VALUE (lp) |
|---|---|---|---|---|---|---|---|
| EXAMPLE 1 | PROJECTION FORMING AGENT 1 | 80 | PRESENT | 12.8 | 10.5 | 2.3 | 0.25 |
| EXAMPLE 2 | PROJECTION FORMING AGENT 1 | 100 | PRESENT | 12.0 | 10.0 | 2.0 | 0.3 |
| EXAMPLE 3 | PROJECTION FORMING AGENT 1 | 120 | PRESENT | 8.0 | 5.9 | 2.1 | 0.36 |
| EXAMPLE 4 | PROJECTION FORMING AGENT 2 | 80 | PRESENT | 15.9 | 13.1 | 2.8 | 0.28 |
| EXAMPLE 5 | PROJECTION FORMING AGENT 2 | 100 | PRESENT | 15.2 | 12.8 | 2.4 | 0.33 |
| EXAMPLE 6 | PROJECTION FORMING AGENT 3 | 80 | PRESENT | 14.8 | 12.2 | 2.6 | 0.26 |
| EXAMPLE 7 | PROJECTION FORMING AGENT 3 | 100 | PRESENT | 14.0 | 11.7 | 2.3 | 0.31 |
| COMPARATIVE EXAMPLE 1 | PROJECTION FORMING AGENT 4 | 80 | PRESENT | 29.8 | 22.4 | 7.4 | 0.55 |
| COMPARATIVE EXAMPLE 2 | PROJECTION FORMING AGENT 4 | 100 | PRESENT | 27.7 | 22.5 | 5.2 | 0.6 |
| COMPARATIVE EXAMPLE 3 | PROJECTION FORMING AGENT 5 | 80 | PRESENT | 10.8 | 7.3 | 3.5 | 0.6 |
| COMPARATIVE EXAMPLE 4 | PROJECTION FORMING AGENT 5 | 100 | PRESENT | 9.3 | 6.1 | 3.2 | 0.65 |
| COMPARATIVE EXAMPLE 5 | ABSENT | 80 | PRESENT | 5.2 | 1.8 | 3.4 | 0.7 |
| COMPARATIVE EXAMPLE 6 | ABSENT | 100 | PRESENT | 3.0 | 1.4 | 1.6 | STICKING |
| COMPARATIVE EXAMPLE 7 | PROJECTION FORMING AGENT 1 | 80 | ABSENT | 12.8 | 10.5 | 2.3 | 0.52 |
| COMPARATIVE EXAMPLE 8 | PROJECTION FORMING AGENT 2 | 80 | ABSENT | 15.9 | 13.1 | 2.8 | 0.55 |
| COMPARATIVE EXAMPLE 9 | PROJECTION FORMING AGENT 3 | 80 | ABSENT | 14.8 | 12.2 | 2.6 | 0.54 |

RECORDING DEVICE, READING DEVICE, RECORDING METHOD, RECORDING PROGRAM, READING METHOD, READING PROGRAM, AND MAGNETIC TAPE

CROSS REFERENCE TO RELATED APPLICATIONS

The present application is a Continuation of PCT International Application No. PCT/JP2020/001095, filed on Jan. 15, 2020, which claims priority from Japanese Patent Application No. 2019-045624, filed on Mar. 13, 2019. Each application above is hereby expressly incorporated by reference, in its entirety, into the present application.

BACKGROUND

Technical Field

The present disclosure relates to a recording device, a reading device, a recording method, a recording program, a reading method, a reading program, and a magnetic tape.

Related Art

In the related art, it has been proposed to form a projection on a magnetic layer surface to control a shape of the magnetic layer surface (refer to JP2011-28826A and JP2017-168178A).

On the other hand, a technique of recording image data representing a medical image and information about image data such as a patient name on a magnetic recording medium is disclosed (refer to JP2013-222489A).

A data storage method is disclosed in which a file and a directory in which file information is stored are stored in a physically continuous area of a compact disc read only memory (CD-ROM) (refer to JP1993-282796A (JP-H05-282796A)).

In a sliding-type magnetic recording/playback device, the recording of information on the magnetic recording medium and the playback of the recorded information are performed by causing the magnetic layer surface of the magnetic recording medium and a magnetic head to be brought into contact with each other and to move slidingly. A high friction coefficient during the sliding between the magnetic layer surface and the magnetic head causes a decrease in running stability and the like. On the contrary, the controlling of the shape of the magnetic layer surface may contribute to lowering the above friction coefficient.

In order to record the information on the magnetic recording medium and play back the recorded information, the sliding between the magnetic layer surface and the magnetic head is repeated. Regarding this point, even though a low friction coefficient can be realized at an initial stage of the sliding by controlling the shape of the magnetic layer surface as proposed in the related art, a phenomenon that the friction coefficient increases with the repetition of the sliding may occur.

On the other hand, the magnetic recording medium rarely reads out the data in the order in which the data is written. Therefore, at the time of reading out the data, random access is performed in which the data is read out by repeatedly causing the magnetic recording medium to reciprocate. As a method of using the magnetic recording medium, a large number of relatively small data may be read and written. In this case, since physical positions of the data to be read out are more discretized, the number of times of repeated reciprocation of the magnetic recording medium also increases. As the capacity of magnetic recording medium has increased in recent years, an amount of recordable data has also increased. Therefore, at the time of reading out the data from such a large-capacity magnetic recording medium, the number of times of repeated reciprocation is further increased. As a result, the running stability of the magnetic recording medium is significantly decreased.

SUMMARY OF THE INVENTION

The present disclosure has been made in view of the above circumstances, and an object of the present disclosure is to suppress an increase in a friction coefficient and improve a decrease in running stability of a magnetic recording medium.

In order to achieve the above object, a recording device of the present disclosure comprises a generation unit that generates a hierarchy of a group that classifies each piece of data from information about each of a plurality of pieces of data to be recorded, and a control unit that controls recording of the plurality of pieces of data included in a group of the hierarchy at a highest level on a magnetic recording medium in a recording order according to an order from an upper hierarchy to a lower hierarchy, for each group of the hierarchy at the highest level.

The magnetic recording medium has a magnetic layer containing a ferromagnetic powder and a binding agent on a non-magnetic support. A difference between a spacing $S_{0.5}$ measured under a pressure of 0.5 atm by an optical interference method after n-hexane cleaning on a surface of the magnetic layer and a spacing $S_{13.5}$ measured under a pressure of 13.5 atm by the optical interference method after the n-hexane cleaning on the surface of the magnetic layer, $S_{0.5}-S_{13.5}$, is equal to or less than 3.0 nm.

In the recording device of the present disclosure, the difference may be 1.5 nm or more and 3.0 nm or less.

In the recording device of the present disclosure, $S_{0.5}$ may be in a range of 5.0 to 50.0 nm.

In the present specification, "to" indicating a range of numerical values includes an upper limit and a lower limit of the numerical values. That is, 5.0 to 50.0 nm means 5.0 nm or more and 50.0 nm or less.

In the recording device of the present disclosure, the magnetic layer may contain an inorganic oxide-based particle.

In the recording device of the present disclosure, the inorganic oxide-based particle may be a composite particle of an inorganic oxide and a polymer.

In the recording device of the present disclosure, the magnetic layer may contain one or more types of lubricants selected from the group consisting of a fatty acid, a fatty acid ester, and a fatty acid amide.

The recording device of the present disclosure may further have a non-magnetic layer containing a non-magnetic powder and a binding agent between the non-magnetic support and the magnetic layer.

The recording device of the present disclosure may further have a back coating layer containing a non-magnetic powder and a binding agent on a surface side of the non-magnetic support opposite to a surface side having the magnetic layer.

In the recording device of the present disclosure, the magnetic recording medium may be a magnetic tape.

In the recording device of the present disclosure, the control unit may control the recording of the plurality of pieces of data on the magnetic recording medium with a single recording instruction.

In the recording device of the present disclosure, in a case where the plurality of pieces of data are recorded on each of a plurality of magnetic recording media, the generation unit may generate a plurality of hierarchies by making a hierarchical relationship of the hierarchy different corresponding to each of the plurality of magnetic recording media, and the control unit may control the recording of the plurality of pieces of data on each of the plurality of magnetic recording media in the recording order according to each of the hierarchies generated by the generation unit.

The recording device of the present disclosure may further comprise a reception unit that receives information representing a hierarchical relationship of the hierarchy.

On the other hand, in order to achieve the above object, the recording device of the present disclosure comprises a reception unit that receives identification information of data to be read, and a reading unit that reads the data according to the identification information from a magnetic recording medium on which a plurality of pieces of data included in a group of a hierarchy at a highest level are recorded in a recording order according to an order from an upper hierarchy to a lower hierarchy, for each group of the hierarchy at the highest level in the hierarchy of the group that classifies each piece of data, which is generated from information about each of the plurality of pieces of data.

The magnetic recording medium has a magnetic layer containing a ferromagnetic powder and a binding agent on a non-magnetic support. A difference between a spacing $S_{0.5}$ measured under a pressure of 0.5 atm by an optical interference method after n-hexane cleaning on a surface of the magnetic layer and a spacing $S_{13.5}$ measured under a pressure of 13.5 atm by the optical interference method after the n-hexane cleaning on the surface of the magnetic layer, $S_{0.5}-S_{13.5}$, is equal to or less than 3.0 nm.

In the reading device of the present disclosure, in a case where the data to be read is read from a plurality of magnetic recording media on which the plurality of pieces of data are recorded in the recording order according to a plurality of hierarchies having different hierarchical relationships, the reading unit may read the data from the magnetic recording medium on which the data to be read is recorded in a highest hierarchy, among the plurality of magnetic recording media.

In order to achieve the above object, a recording method of the present disclosure is a recording method executed by a computer including generating a hierarchy of a group that classifies each piece of data from information about each of a plurality of pieces of data to be recorded, and controlling recording of the plurality of pieces of data included in a group of the hierarchy at a highest level on a magnetic recording medium in a recording order according to an order from an upper hierarchy to a lower hierarchy, for each group of the hierarchy at the highest level.

The magnetic recording medium has a magnetic layer containing a ferromagnetic powder and a binding agent on a non-magnetic support. A difference between a spacing $S_{0.5}$ measured under a pressure of 0.5 atm by an optical interference method after n-hexane cleaning on a surface of the magnetic layer and a spacing $S_{13.5}$ measured under a pressure of 13.5 atm by the optical interference method after the n-hexane cleaning on the surface of the magnetic layer, $S_{0.5}-S_{13.5}$, is equal to or less than 3.0 nm.

In order to achieve the above object, a recording program of the present disclosure is a recording program causing a computer to execute generating a hierarchy of a group that classifies each piece of data from information about each of a plurality of pieces of data to be recorded, and controlling recording of the plurality of pieces of data included in a group of the hierarchy at a highest level on a magnetic recording medium in a recording order according to an order from an upper hierarchy to a lower hierarchy, for each group of the hierarchy at the highest level.

The magnetic recording medium has a magnetic layer containing a ferromagnetic powder and a binding agent on a non-magnetic support. A difference between a spacing $S_{0.5}$ measured under a pressure of 0.5 atm by an optical interference method after n-hexane cleaning on a surface of the magnetic layer and a spacing $S_{13.5}$ measured under a pressure of 13.5 atm by the optical interference method after the n-hexane cleaning on the surface of the magnetic layer, $S_{0.5}-S_{13.5}$, is equal to or less than 3.0 nm.

In order to achieve the above object, a reading method of the present disclosure is a reading method executed by a computer including receiving identification information of data to be read, and reading the data according to the identification information from a magnetic recording medium on which a plurality of pieces of data included in a group of a hierarchy at a highest level are recorded in a recording order according to an order from an upper hierarchy to a lower hierarchy, for each group of the hierarchy at the highest level in the hierarchy of the group that classifies each piece of data, which is generated from information about each of the plurality of pieces of data.

The magnetic recording medium has a magnetic layer containing a ferromagnetic powder and a binding agent on a non-magnetic support. A difference between a spacing $S_{0.5}$ measured under a pressure of 0.5 atm by an optical interference method after n-hexane cleaning on a surface of the magnetic layer and a spacing $S_{13.5}$ measured under a pressure of 13.5 atm by the optical interference method after the n-hexane cleaning on the surface of the magnetic layer, $S_{0.5}-S_{13.5}$, is equal to or less than 3.0 nm.

In order to achieve the above object, a reading program of the present disclosure is a reading program causing a computer to execute receiving identification information of data to be read, and reading the data according to the identification information from a magnetic recording medium on which a plurality of pieces of data included in a group of a hierarchy at a highest level are recorded in a recording order according to an order from an upper hierarchy to a lower hierarchy, for each group of the hierarchy at the highest level in the hierarchy of the group that classifies each piece of data, which is generated from information about each of the plurality of pieces of data.

The magnetic recording medium has a magnetic layer containing a ferromagnetic powder and a binding agent on a non-magnetic support. A difference between a spacing $S_{0.5}$ measured under a pressure of 0.5 atm by an optical interference method after n-hexane cleaning on a surface of the magnetic layer and a spacing $S_{13.5}$ measured under a pressure of 13.5 atm by the optical interference method after the n-hexane cleaning on the surface of the magnetic layer, $S_{0.5}-S_{13.5}$, is equal to or less than 3.0 nm.

In order to achieve the above object, a magnetic tape of the present disclosure is a magnetic tape on which a plurality of pieces of data included in a group of a hierarchy at a highest level are recorded in a recording order according to an order from an upper hierarchy to a lower hierarchy, for each group of the hierarchy at the highest level in the hierarchy of the group that classifies each piece of data, which is generated from information about each of the plurality of pieces of data.

The magnetic tape comprises a non-magnetic support, and a magnetic layer containing a ferromagnetic powder and a binding agent on the non-magnetic support. A magnetic layer containing a ferromagnetic powder and a binding agent is included on a non-magnetic support. A difference between a spacing $S_{0.5}$ measured under a pressure of 0.5 atm by an optical interference method after n-hexane cleaning on a surface of the magnetic layer and a spacing $S_{13.5}$ measured under a pressure of 13.5 atm by the optical interference method after the n-hexane cleaning on the surface of the magnetic layer, $S_{0.5}-S_{13.5}$, is equal to or less than 3.0 nm.

Another recording device of the present disclosure comprises a memory for storing a command to be executed by a computer, and a processor configured to execute the stored command.

The processor generates a hierarchy of a group that classifies each piece of data from information about each of a plurality of pieces of data to be recorded, and controls recording of the plurality of pieces of data included in a group of the hierarchy at a highest level on a magnetic recording medium in a recording order according to an order from an upper hierarchy to a lower hierarchy, for each group of the hierarchy at the highest level.

The magnetic recording medium has a magnetic layer containing a ferromagnetic powder and a binding agent on a non-magnetic support. A difference between a spacing $S_{0.5}$ measured under a pressure of 0.5 atm by an optical interference method after n-hexane cleaning on a surface of the magnetic layer and a spacing $S_{13.5}$ measured under a pressure of 13.5 atm by the optical interference method after the n-hexane cleaning on the surface of the magnetic layer, $S_{0.5}-S_{13.5}$, is equal to or less than 3.0 nm.

Another reading device of the present disclosure comprises a memory for storing a command to be executed by a computer, and a processor configured to execute the stored command.

The processor receives identification information of data to be read, and reads the data according to the identification information from a magnetic recording medium on which a plurality of pieces of data included in a group of a hierarchy at a highest level are recorded in a recording order according to an order from an upper hierarchy to a lower hierarchy, for each group of the hierarchy at the highest level in the hierarchy of the group that classifies each piece of data, which is generated from information about each of the plurality of pieces of data.

The magnetic recording medium has a magnetic layer containing a ferromagnetic powder and a binding agent on a non-magnetic support. A difference between a spacing $S_{0.5}$ measured under a pressure of 0.5 atm by an optical interference method after n-hexane cleaning on a surface of the magnetic layer and a spacing $S_{13.5}$ measured under a pressure of 13.5 atm by the optical interference method after the n-hexane cleaning on the surface of the magnetic layer, $S_{0.5}-S_{13.5}$, is equal to or less than 3.0 nm.

According to the present disclosure, it is possible to suppress the increase in the friction coefficient and improve the decrease in running stability of the magnetic recording medium.

BRIEF DESCRIPTION OF THE DRAWINGS

FIG. 7 is a flowchart showing an example of recording processing according to a first embodiment.

FIG. 8 is a block diagram showing an example of a functional configuration in a case where an object of the information processing device according to each embodiment is read.

FIG. 9 is a flowchart showing an example of reading processing according to the first embodiment.

FIG. 10 is a diagram showing an example of a group hierarchy according to a second embodiment.

FIG. 11 is a table showing an example of a recording order of objects according to the second embodiment.

FIG. 14 is a table showing results of Examples of the present disclosure.

DETAILED DESCRIPTION

Hereinafter, an embodiment for implementing a technique of the present disclosure will be described in detail with reference to drawings.

First Embodiment

Figure 1:
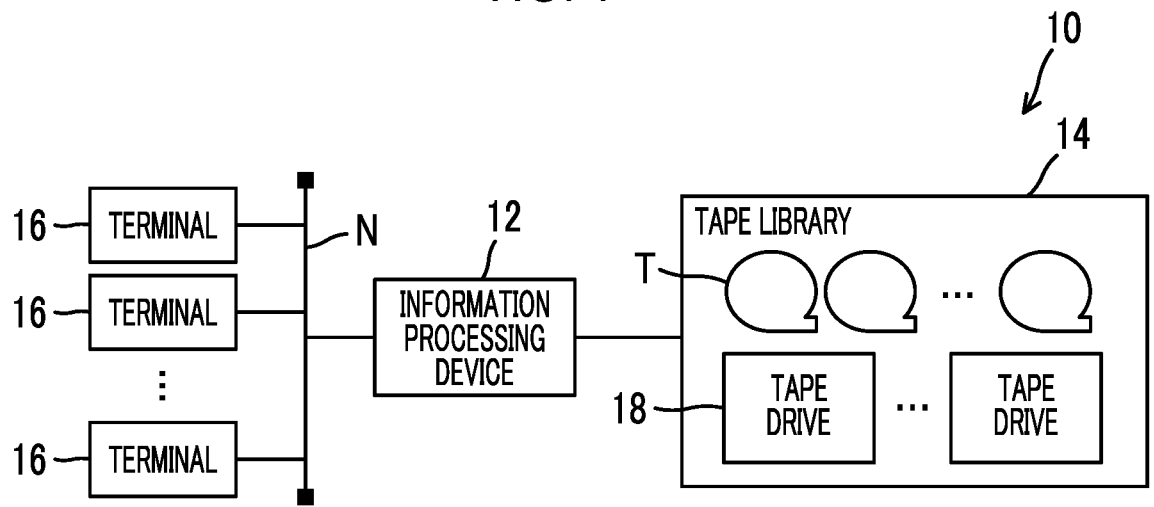
FIG. 1 is a block diagram showing an example of a configuration of a recording/reading system according to each embodiment.

First, a configuration of a recording/reading system 10 according to the present embodiment will be described with reference to FIG. 1. As shown in FIG. 1, the recording/reading system 10 includes an information processing device 12 and a tape library 14. The tape library 14 is connected to the information processing device 12. The information processing device 12 and a plurality of terminals 16 are connected to a network N and can communicate through the network N.

The tape library 14 comprises a plurality of slots (not shown) and a plurality of tape drives 18, and a magnetic tape T as an example of a magnetic recording medium is stored in each slot. An example of the magnetic tape T includes a linear tape-open (LTO) tape. The magnetic recording medium will be described below.

In a case where the information processing device 12 writes or reads data on the magnetic tape T, the magnetic tape T to be written or read is loaded from a slot into a predetermined tape drive 18. In a case where the information processing device 12 completes the writing or reading for the magnetic tape T loaded into the tape drive 18, the magnetic tape T is unloaded from the tape drive 18 to the originally stored slot.

In the present embodiment, an embodiment will be described in which an object including data to be saved by a user, such as document data and image data, and metadata as an example of information about the data is applied as a unit for handling the data to be recorded on the magnetic tape T. A storage system that handles this object is referred to as an object storage system. In the present embodiment, an embodiment will be described in which medical data compliant to a standard set in advance such as digital imaging and communications in medicine (DICOM) is applied as the data recorded on the magnetic tape T.

Figure 2:
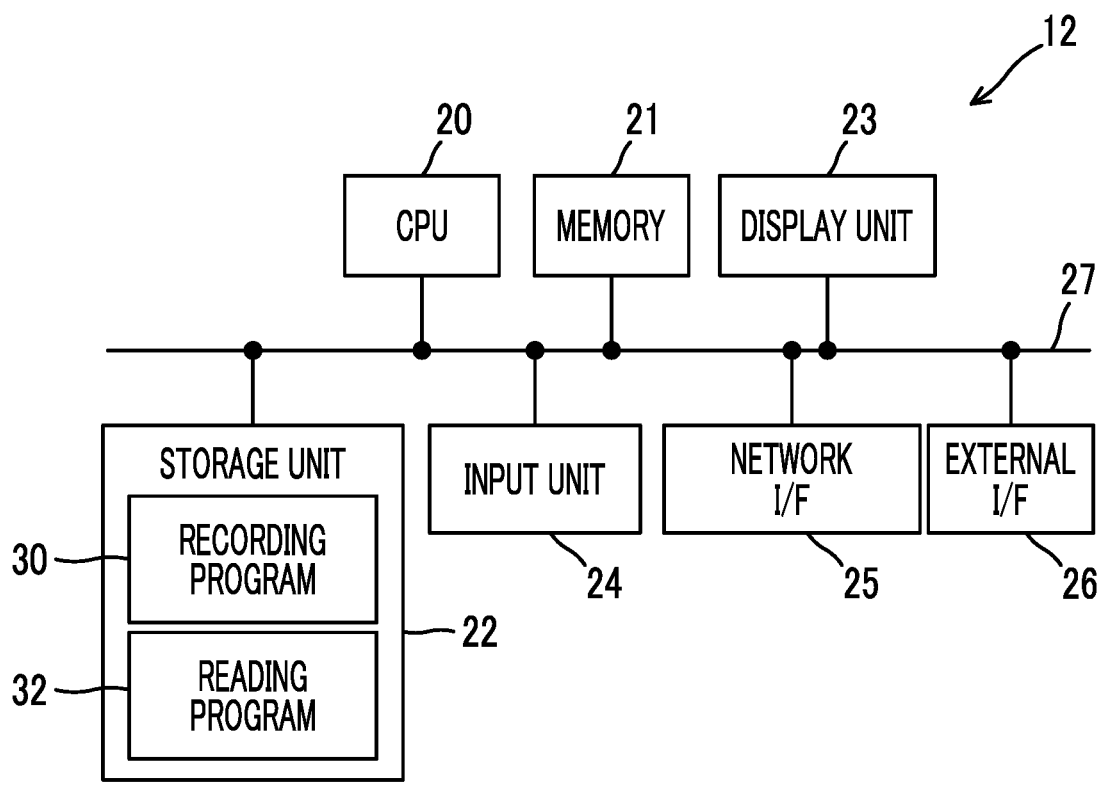
FIG. 2 is a block diagram showing an example of a hardware configuration of an information processing device according to each embodiment.

Next, a hardware configuration of the information processing device 12 according to the present embodiment will be described with reference to FIG. 2. As shown in FIG. 2, the information processing device 12 includes a central processing unit (CPU) 20, a memory 21 as a temporary storage area, and a nonvolatile storage unit 22. The information processing device 12 includes a display unit 23 such as a liquid crystal display, an input unit 24 such as a keyboard and a mouse, a network interface (I/F) 25 connected to the network N, and an external I/F 26 connected to the tape library 14. The CPU 20, the memory 21, the storage unit 22, the display unit 23, the input unit 24, the network I/F 25, and the external I/F 26 are connected to a bus 27.

The storage unit 22 is formed by a hard disk drive (HDD), a solid state drive (SSD), a flash memory, and the like. The storage unit 22 as a storage medium stores a recording program 30 and a reading program 32. The CPU 20 reads out the recording program 30 from the storage unit 22, develops the program in the memory 21, and executes the developed recording program 30. The CPU 20 reads out the reading program 32 from the storage unit 22, develops the program in the memory 21, and executes the developed reading program 32. An example of the information processing device 12 includes a server computer. The information processing device 12 is an example of a recording device that records the object on the magnetic tape T. The information processing device 12 is also an example of a reading device that reads the object recorded on the magnetic tape T.

Figure 3:
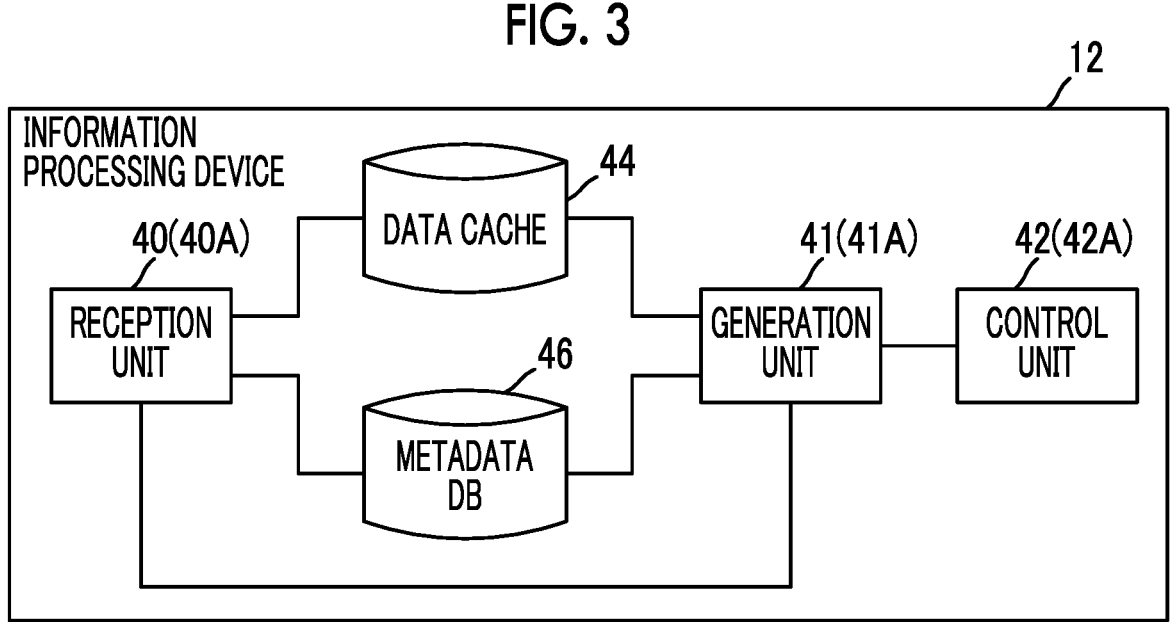
FIG. 3 is a block diagram showing an example of a functional configuration in a case where an object of the information processing device according to each embodiment is recorded.

Next, a functional configuration in a case where the object is recorded on the magnetic tape T of the information processing device 12 according to the present embodiment will be described with reference to FIG. 3. As shown in FIG. 3, the information processing device 12 includes a reception unit 40, a generation unit 41, and a control unit 42. The CPU 20 executes the recording program 30 to function as the reception unit 40, the generation unit 41, and the control unit 42. Further, a data cache 44 in which an object described below is stored and a metadata database (DB) 46 in which metadata described below is stored are prepared in a predetermined storage area of the storage unit 22. The data cache 44 and the metadata DB 46 are prepared for each magnetic tape T.

The reception unit 40 receives the data and the metadata related to the data, transmitted from the terminal 16 using an application programming interface (API) for handling the object, through the network I/F 25. The reception unit 40 stores the received data in the data cache 44 and stores the received metadata in the metadata DB 46. The metadata transmitted from the terminal 16 includes identification information such as a data name of corresponding data, a data size, and attribute information indicating a data attribute such as a time stamp.

In a case where the corresponding data is a medical image, the above attribute information included in the metadata according to the present embodiment also includes a type (also referred to as modality) of an imaging device used for capturing the medical image. Examples of the type of the imaging device used for capturing the medical image include computed tomography (CT), magnetic resonance imaging (MRI), and positron emission tomography (PET). The above attribute information included in the metadata also includes a patient name for identifying which patient the corresponding data is for, a diagnosis date of the corresponding data, information about a diagnosis result described in a chart (hereinafter, referred to as "diagnosis information"), and the like. These pieces of attribute information included in the metadata is tagged with each attribute name and included in the metadata.

Specifically, for example, the metadata includes a tag "patient name" and information "patient A" corresponding to the tag.

Figure 4:
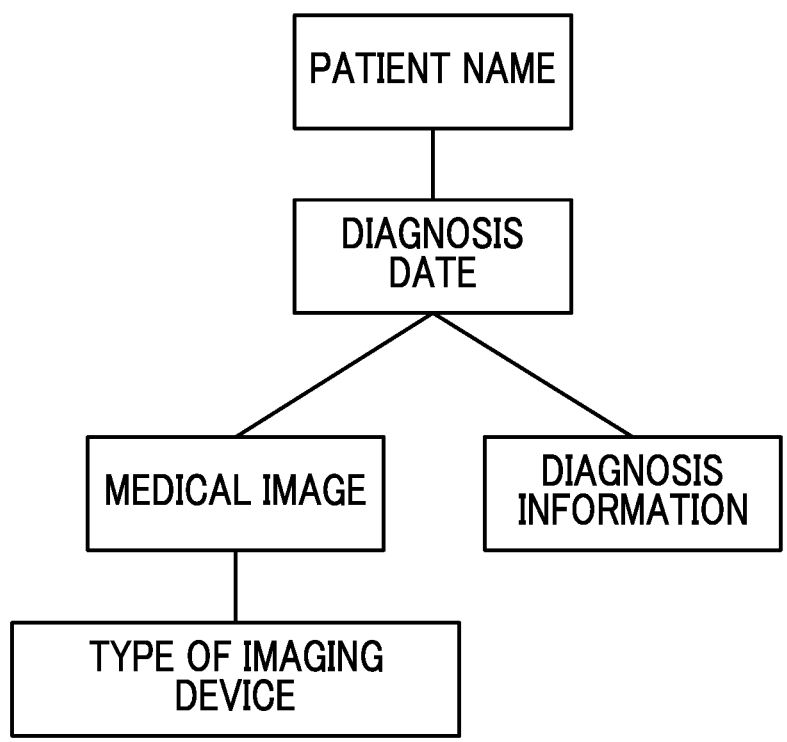
FIG. 4 is a diagram showing an example of a hierarchical relationship of a hierarchy according to each embodiment.

The reception unit 40 receives information, which is input by the user through the input unit 24, representing a hierarchical relationship of the hierarchy with a unit of a group that classifies each object. FIG. 4 shows an example of the hierarchical relationship of the hierarchy. FIG. 4 shows an example in which "patient name", "diagnosis date", "medical image", "diagnosis information", and "type of imaging device" are designated as the unit of the group. FIG. 4 shows an example in which the "patient name" is the highest hierarchy, a lower hierarchy of the "patient name" is the "diagnosis date", a lower hierarchy of the "diagnosis date" is the "medical image" and the "diagnosis information", and a lower hierarchy of the "medical image" is "type of imaging device". It goes without saying that the hierarchical relationship of the hierarchy shown in FIG. 4 is an example and is not limited thereto.

Figures 5, 6:
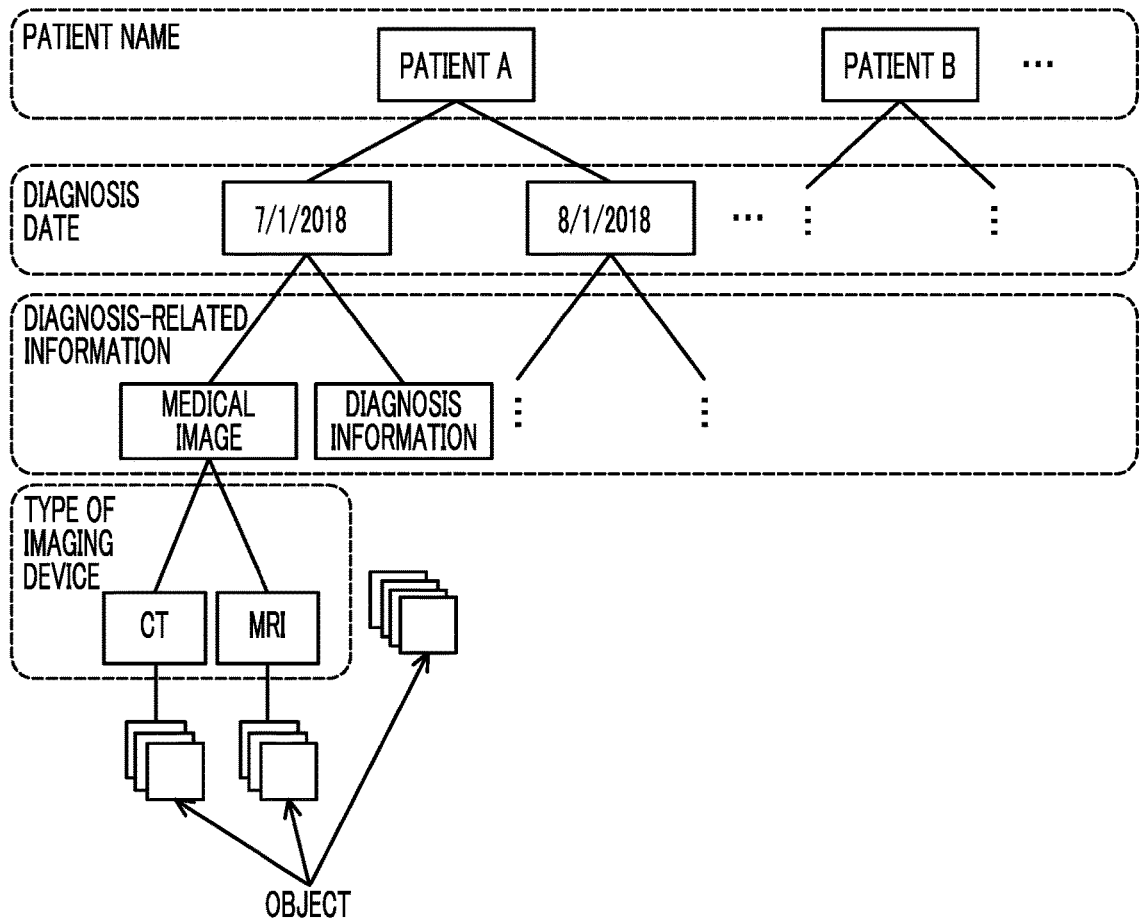
FIG. 5 is a diagram showing an example of a group hierarchy according to each embodiment.
FIG. 6 is a table showing an example of a recording order of objects according to each embodiment.

The generation unit 41 generates the hierarchy of the group that classifies each object from the metadata of each of a plurality of objects to be recorded according to the information representing the above hierarchical relationship received by the reception unit 40. Specifically, the generation unit 41 generates the group hierarchy according to the information representing the hierarchical relationship from the tag of the metadata included in each object and the information corresponding to the tag. FIG. 5 shows an example of the hierarchy generated by the generation unit 41 according to the information shown in FIG. 4.

As shown in FIG. 5, an object group is grouped for each patient name which is the highest hierarchy, and further, the object group is grouped for each diagnosis date which is the lower hierarchy of the patient name. The object group is grouped for each medical image and for each piece of diagnosis information which are lower hierarchies of the diagnosis date hierarchy, and further, the object group is grouped for each type of imaging device which is the lower hierarchy of the medical image.

The objects included in the groups in the lowest hierarchy shown in FIG. 5 ("CT", "MRI", and "diagnosis information" in the example of FIG. 5) include all the traced groups in the metadata in a case where the hierarchies are traced from the highest group to the lowest group. Specifically, for example, the object included in "CT" shown in the lower left of FIG. 5 includes "patient A" as the patient name, "Jul. 1, 2018" as the diagnosis date, "medical image" as the type of data, and "CT" as the type of imaging device in the metadata.

The control unit 42 controls the tape library 14 to load the magnetic tape T to be recorded of the object into the predetermined tape drive 18. The control unit 42 controls the recording of each object including the data stored in the data cache 44 and the corresponding metadata stored in the metadata DB 46 on the magnetic tape T in a recording order shown below. That is, in this case, the control unit 42 controls the recording of the plurality of objects included in the group of the highest hierarchy for each group of the highest hierarchy generated by the generation unit 41 on the magnetic tape T, in the recording order according to the order from the upper hierarchy to the lower hierarchy.

An example of a specific recording order of the object group shown in FIG. 5 will be described with reference to FIG. 6. As shown in FIG. 6, in the present embodiment, the objects to be recorded are arranged in the order of the patient names (order of "patient A" and "patient B" in the example of FIG. 6), which is the highest hierarchy, under the control of the control unit 42. The patient objects indicated by each patient name are arranged in the order of the diagnosis dates (order of "2018 Jul. 1" and "2018 Aug. 1" in the example of FIG. 6), which is the lower hierarchy of the patient name. The objects for each diagnosis date are arranged in the order of the medical images and the diagnosis information, which are the lower hierarchies of the diagnosis date. The objects for each medical image are arranged in the order of the types of imaging devices (order of "CT" and "MRI" in the example of FIG. 6), which is the lower hierarchy of the medical image.

The control unit 42 controls the recording of the plurality of objects on the magnetic tape T with a single recording instruction in the order arranged as described above. Specifically, the control unit 42 outputs the recording instruction to the magnetic tape T to a control unit (not shown) provided in the tape drive 18 and outputs each object to the control unit provided in the tape drive 18 in the order arranged as described above. The control unit provided in the tape drive 18 continuously records the objects on the magnetic tape T according to an order input from the control unit 42. That is, in the example of FIG. 6, the objects are recorded on the magnetic tape T in the order from the left side to the right side of FIG. 6.

The control unit 42 controls the recording of the group hierarchy generated by the generation unit 41 in a recording area (for example, the head portion of the magnetic tape T) for recording management information of the magnetic tape T. The control unit 42 may store the group hierarchy generated by the generation unit 41 in the storage unit 22 in association with the identification information of the magnetic tape T. Further, the control unit 42 also controls the recording of a recording position of the head object of each group as a recording position of each group on the magnetic tape T, in the recording area for recording the management information.

A recording order of the groups in the parallel hierarchy is not particularly limited. The recording order of the groups in the parallel hierarchy may be random, an order of the group identification information, or designated by the user. Specifically, for example, FIG. 6 shows an example in which the objects are recorded in an order of CT and MRI for CT and MRI, which are lower hierarchies of the medical image, but the objects may be recorded in an order of MRI and CT.

Next, the magnetic recording medium used as the magnetic tape T of the present embodiment will be described.

[Magnetic Recording Medium]

One aspect of the magnetic recording medium used in the present embodiment relates to a magnetic recording medium that has a magnetic layer containing a ferromagnetic powder and a binding agent on a non-magnetic support and in which a difference between a spacing $S_{0.5}$, which is measured under a pressure of 0.5 atm by an optical interference method after n-hexane cleaning on a surface of the magnetic layer and a spacing $S_{13.5}$, which is measured under a pressure of 13.5 atm by the optical interference method after the n-hexane cleaning on the surface of the magnetic layer ($S_{0.5}$–$S_{13.5}$) is equal to or less than 3.0 nm.

In the present embodiment, the term "n-hexane cleaning" refers to ultrasonic cleaning (ultrasonic output: 40 kHz) for 100 seconds by immersing a sample piece cut out from the magnetic recording medium in fresh n-hexane (200 g) having a liquid temperature of 20° C. to 25° C. In a case where the magnetic recording medium to be cleaned is a magnetic tape, a sample piece having a length of 5 cm is cut out and subjected to the n-hexane cleaning. A width of the magnetic tape and a width of the sample piece cut out from the magnetic tape are usually ½ inch. 1 inch=0.0254 meters. For a magnetic tape having a width other than ½ inch width, a sample piece having a length of 5 cm may be cut out and subjected to the n-hexane cleaning. In a case where the magnetic recording medium to be cleaned is a magnetic disk, a sample piece having a size of 5 cm×1.27 cm is cut out and subjected to the n-hexane cleaning. The spacing measurement described in detail below is performed after the sample piece after the n-hexane cleaning is left under an environment with a temperature of 23° C. and a relative humidity of 50% for 24 hours.

In the present embodiment, the term "surface of the magnetic layer" of the magnetic recording medium is synonymous with a surface on a magnetic layer side of the magnetic recording medium.

In the present embodiment, the spacing measured by the optical interference method on the magnetic layer surface of the magnetic recording medium is a value measured by the following method.

In a state where the magnetic recording medium (for details, the above sample piece. The same applies below) and a transparent plate-shaped member (for example, a glass plate) are overlapped such that the magnetic layer surface of the magnetic recording medium faces the transparent plate-shaped member, a pressing member is pressed with the pressure of 0.5 atm or 13.5 atm from a side opposite to the magnetic layer side of the magnetic recording medium. In this state, the magnetic layer surface of the magnetic recording medium is irradiated with light through the transparent plate-shaped member (irradiation area: 150,000 to 200,000 $\mu m^2$), and the spacing (distance) between the magnetic layer surface of the magnetic recording medium and a surface on a magnetic recording medium side of the transparent plate-shaped member is obtained based on intensity of interference light (for example, contrast of interference fringe image) generated by an optical path difference between reflected light from the magnetic layer surface of the magnetic recording medium and reflected light from the surface on the magnetic recording medium side of the transparent plate-shaped member. The light to be irradiated here is not particularly limited. In a case where the light to be irradiated is light having an emission wavelength over a relatively wide wavelength range, such as white light containing light of a plurality of wavelengths, a member having a function of selectively cutting light of a specific wavelength or light other than the specific wavelength region such as an interference filter is disposed between the transparent plate-shaped member and a light receiving unit that receives the reflected light to cause light of a part of the wavelengths or light of a part of the wavelength region in the reflected light to be selectively incident on the light receiving unit. In a case where the light to be irradiated is light having a single emission peak (so-called monochromatic light), the above member may not be used. As an example, the wavelength of the light incident on the light receiving unit can be in a range of, for example, 500 to 700 nm. However, the wavelength of the light incident on the light receiving unit is not limited to the above range. The transparent plate-shaped member may be a member having transparency that transmits the light to be irradiated to the extent that light is irradiated to the magnetic recording medium through this member to obtain the interference light.

The interference fringe image obtained by the measurement of the spacing is divided into 300,000 points to obtain a spacing of each point (distance between the magnetic layer surface of the magnetic recording medium and the surface on the magnetic recording medium side of the transparent plate-shaped member). With the obtained spacing of each point as a histogram, the most frequent value in this histogram is set as the spacing.

Five sample pieces are cut out from the same magnetic recording medium, the pressing member is pressed with the pressure of 0.5 atm after the n-hexane cleaning to obtain the spacing $S_{0.5}$, and the pressing member is further pressed with the pressure of 13.5 atm to obtain the spacing $S_{13.5}$. The difference between the obtained $S_{0.5}$ and $S_{13.5}$ ($S_{0.5}-S_{13.5}$) is calculated. An arithmetical mean of the difference ($S_{0.5}-S_{13.5}$) calculated for the five sample pieces is set as the difference ($S_{0.5}-S_{13.5}$) for the magnetic recording medium.

The above measurement can be performed using a commercially available tape spacing analyzer (TSA) such as Tape Spacing Analyzer manufactured by Micro Physics. The spacing measurement in Examples is performed using the Tape Spacing Analyzer manufactured by Micro Physics.

A friction coefficient during sliding between the magnetic layer surface and a magnetic head can be reduced by forming a projection on the magnetic layer surface to reduce a portion of the magnetic layer surface that is in contact with the magnetic head (so-called true contact). However, in a case where a height of the projection on the magnetic layer surface is lowered due to repeated sliding with the magnetic head, the portion of the magnetic layer surface that is in true contact with the magnetic head increases and the friction coefficient increases.

In regards to the above point, the inventors of the present disclosure study diligently and conclude that the pressure applied to the magnetic layer surface in a case where the sliding with the magnetic head is repeated is not constant and a large pressure may be applied, and thus lowering of the height of the projection due to deformation of the projection or sinking into the magnetic layer in a case where the large pressure is applied may cause the friction coefficient to increase in a case where the sliding with the magnetic head is repeated. The case where the large pressure is applied may be, for example, the time of contact with an edge portion of the magnetic head. On the contrary, the fact that the difference ($S_{0.5}-S_{13.5}$) between $S_{0.5}$ and $S_{13.5}$ obtained by the above method is as small as 3.0 nm or less means that a large change in the height of the projection on the magnetic layer surface is unlikely to occur even in a case where the large pressure is applied. Therefore, it is considered that the magnetic recording medium having the difference of 3.0 nm or less has little change in the height of the projections on the magnetic layer surface even though the sliding with the magnetic head is repeated. The inventors of the present disclosure presume that this is the reason why the increase in the friction coefficient can be suppressed even though the sliding with the magnetic head is repeated, with the magnetic recording medium. However, the present disclosure is not limited to the above presumption.

By the way, in regards to the pressure at the time of pressing in the measurement of the spacing, in the present embodiment, 0.5 atm is employed as an exemplified value of the pressure mainly applied to the magnetic layer surface during the sliding with the magnetic head and 13.5 atm is employed as an exemplified value of the large pressure applied to the magnetic layer surface during the sliding with the magnetic head. The pressure applied to the magnetic recording medium during the sliding with the magnetic head is not limited to the above pressure. As a result of the diligent study by the inventors of the present disclosure, it has been newly found that the increase in the friction coefficient can be suppressed even though the sliding with the magnetic head is repeated by controlling the difference obtained by employing the above pressures. A method of controlling the difference will be described below.

Hereinafter, the magnetic recording medium will be described in more detail. In the following, the increase in the friction coefficient with the repeating sliding between the magnetic layer surface and the magnetic head is also simply referred to as "increase in friction coefficient".

<Magnetic Layer>

(Difference ($S_{0.5}-S_{13.5}$))

The difference ($S_{0.5}-S_{13.5}$) of the magnetic recording medium is equal to or less than 3.0 nm, preferably equal to or less than 2.9 nm, more preferably equal to or less than 2.8 nm, still more preferably equal to or less than 2.7 nm, yet more preferably equal to or less than 2.6 nm, and even more preferably equal to or less than 2.5 nm, from a viewpoint of further suppressing the increase in the friction coefficient. The difference can be, for example, 1.0 nm or more, 1.5 nm or more, 1.8 nm or more, or 2.0 nm or more. However, it is more preferable from the viewpoint of suppressing the increase in the friction coefficient as the difference is smaller. Therefore, it is of course possible to fall below the lower limit illustrated above. The difference can be controlled by a type of a non-magnetic filler (hereinafter, referred to as "projection forming agent") capable of forming the projection on the magnetic layer surface and a manufacturing condition of the magnetic recording medium. Details of this point will be described below.

The $S_{0.5}$ and $S_{13.5}$ of the magnetic recording medium are not particularly limited as long as the difference ($S_{0.5}-S_{13.5}$) is 3.0 nm or less. From a viewpoint of improving electromagnetic conversion characteristics, $S_{0.5}$ is preferably equal to or less than 50.0 nm, more preferably equal to or less than 40.0 nm, still more preferably equal to or less than 30.0 nm, yet more preferably equal to or less than 20.0 nm, even more preferably equal to or less than 16.0 nm, further even more preferably equal to or less than 15.5 nm, and still further even more preferably equal to or less than 14.5 nm. From the viewpoint of suppressing the friction coefficient mainly at an initial stage of the sliding with the magnetic head, $S_{0.5}$ is preferably equal to or larger than 5.0 nm, more preferably equal to or larger than 8.0 nm, still more preferably equal to or larger than 10.0 nm, and yet more preferably equal to or larger than 12.0 nm. From a viewpoint of maintaining good running stability even though the sliding with the magnetic head is repeated, $S_{13.5}$ is preferably equal to or larger than 5.0 nm, more preferably equal to or larger than 8.0 nm, and still more preferably equal to or larger than 10.0 nm. From the viewpoint of exhibiting excellent electromagnetic conversion characteristics even though the sliding with the magnetic head is repeated, $S_{13.5}$ is preferably equal to or less than 15.0 nm, more preferably equal to or less than 14.0 nm, still more preferably equal to or less than 13.5 nm, yet more preferably equal to or less than 13.0 nm, and even more preferably equal to or less than 12.0 nm.

(Ferromagnetic Powder)

A ferromagnetic powder usually used in the magnetic layer of various magnetic recording media can be used as the ferromagnetic powder contained in the magnetic layer. It is preferable to use a ferromagnetic powder having a small average particle size, from a viewpoint of improvement in the recording density of the magnetic recording medium. From this viewpoint, the average particle size of the ferromagnetic powder is preferably equal to or less than 50 nm, more preferably equal to or less than 45 nm, still more preferably equal to or less than 40 nm, yet more preferably equal to or less than 35 nm, even more preferably equal to or less than 30 nm, further even more preferably equal to or less than 25 nm, and still further even more preferably equal to or less than 20 nm. On the other hand, from a viewpoint of stability of magnetization, the average particle size of the ferromagnetic powder is preferably equal to or larger than 5 nm, more preferably equal to or larger than 8 nm, still more preferably equal to or larger than 10 nm, yet more preferably equal to or larger than 15 nm, and even more preferably equal to or larger than 20 nm.

A preferred specific example of the ferromagnetic powder includes a hexagonal ferrite powder. For details of the hexagonal ferrite powder, descriptions disclosed in paragraphs 0012 to 0030 of JP2011-225417A, paragraphs 0134 to 0136 of JP2011-216149A, paragraphs 0013 to 0030 of JP2012-204726A, and paragraphs 0029 to 0084 of JP2015-127985A can be referred to, for example. A hexagonal barium ferrite powder and a hexagonal strontium ferrite powder are particularly preferable as the hexagonal ferrite powder.

A preferred aspect in a case where the hexagonal strontium ferrite powder is used as the ferromagnetic powder is as follows.

An activation volume of the hexagonal strontium ferrite powder is preferably in a range of 800 to 1,500 nm$^3$. A particulate hexagonal strontium ferrite powder having the activation volume in the range described above is suitable for manufacturing the magnetic tape MT exhibiting excellent electromagnetic conversion characteristics. The activation volume of the hexagonal strontium ferrite powder is preferably equal to or larger than 800 nm$^3$ and may be, for example, equal to or larger than 850 nm$^3$. From a viewpoint of further improving the electromagnetic conversion characteristics, the activation volume of the hexagonal strontium ferrite powder is more preferably equal to or less than 1,400 nm$^3$, still more preferably equal to or less than 1,300 nm$^3$, yet more preferably equal to or less than 1,200 nm$^3$, and even more preferably equal to or less than 1,100 nm$^3$.

The term "activation volume" is a unit of magnetization reversal and an index indicating magnetic magnitude of a particle. The activation volume and an anisotropy constant Ku described below, described in the present disclosure and the present specification, are obtained from a relational expression of Hc and an activation volume V shown below by performing measurement at magnetic field sweep rates of 3 minutes and 30 minutes by a coercivity Hc measurement unit of a vibrating sample magnetometer (measurement temperature: 23° C.±1° C.). A unit of the anisotropy constant Ku is 1 erg/cc=1.0×10$^{-1}$ J/m$^3$. Hc=2Ku/Ms{1−[(kT/KuV)ln (At/0.693)]$^{1/2}$}

[In the expression, Ku: anisotropy constant (unit: J/m$^3$), Ms: saturation magnetization (unit: kA/m), k: Boltzmann's constant, T: absolute temperature (unit: K), V: activation volume (unit: cm$^3$), A: spin precession frequency (unit: s$^{-1}$), and t: magnetic field reversal time (unit: s)]

An example of an index of the reduction of thermal fluctuation, that is, improvement in thermal stability includes the anisotropy constant Ku. The hexagonal strontium ferrite powder can preferably have Ku equal to or larger than 1.8×10$^5$ J/m$^3$ and more preferably have Ku equal to or larger than 2.0×10$^5$ J/m$^3$. In addition, Ku of the hexagonal strontium ferrite powder can be, for example, equal to or smaller than 2.5×10$^5$ J/m$^3$. However, since higher Ku means that the thermal stability is higher, which is preferable, Ku is not limited to the exemplified value.

From a viewpoint of increasing a playback output in a case where the data recorded on the magnetic tape MT is played back, it is desirable that mass magnetization σs of the ferromagnetic powder included in the magnetic tape MT is high. In regards to this point, in the hexagonal strontium ferrite powder which includes a rare earth atom but does not have rare earth atom surface layer portion uneven distribution, σs tends to significantly decrease as compared with that in the hexagonal strontium ferrite powder not including the rare earth atom. On the contrary, it is considered that the hexagonal strontium ferrite powder having the rare earth atom surface layer portion uneven distribution is preferable for suppressing such a significant decrease in σs. In one aspect, σs of the hexagonal strontium ferrite powder can be equal to or larger than 45 A·m$^2$/kg and can also be equal to or larger than 47 A·m$^2$/kg. On the other hand, from a viewpoint of noise reduction, σs is preferably equal to or smaller than 80 A·m$^2$/kg and more preferably equal to or smaller than 60 A·m$^2$/kg. It is possible to measure σs by using a well-known measurement device, such as the vibrating sample magnetometer, capable of measuring magnetic properties. In the present disclosure and the present specification, the mass magnetization σs is a value measured at magnetic field strength of 15 kOe, unless otherwise noted. 1 [kOe]=10$^6$/4π [A/m].

In a case where the magnetic tape contains the hexagonal strontium ferrite powder in the magnetic layer, an anisotropic magnetic field Hk of the magnetic layer is preferably equal to or larger than 14 kOe, more preferably equal to or larger than 16 kOe, and still more preferably equal to or larger than 18 kOe. The anisotropic magnetic field Hk of the magnetic layer is preferably equal to or less than 90 kOe, more preferably equal to or less than 80 kOe, and still more preferably equal to or less than 70 kOe.

The anisotropic magnetic field Hk in the present disclosure and the present specification means a magnetic field in which the magnetization is saturated in a case where the magnetic field is applied in a direction of magnetization hard axis. It is possible to measure the anisotropic magnetic field Hk by using a well-known measurement device, such as the vibrating sample magnetometer, capable of measuring the magnetic properties. In the magnetic layer containing the hexagonal strontium ferrite powder, the direction of magnetization hard axis of the magnetic layer is an in-plane direction.

A preferred specific example of the ferromagnetic powder includes a metal powder. For details of the metal powder, descriptions disclosed in paragraphs 0137 to 0141 of JP2011-216149A and paragraphs 0009 to 0023 of JP2005-251351A can be referred to, for example.

A preferred specific example of the ferromagnetic powder includes an ε-iron oxide powder. As a method of producing the ε-iron oxide powder, a producing method from a goethite, a reverse micelle method, or the like is known. All of the producing methods are well known. Regarding the method of producing the ε-iron oxide powder in which a part of Fe is substituted with a substituted atom such as Ga, Co, Ti, Al, or Rh, "J. Jpn. Soc. Powder Metallurgy Vol. 61 Supplement, No. S1, pp. S280 to S284, J. Mater. Chem. C, 2013, 1, pp. 5,200 to 5,206", or the like can be referred to, for example. However, the method of producing the ε-iron oxide powder that can be used as the ferromagnetic powder in the magnetic layer is not limited.

A preferred aspect in a case where the ε-iron oxide powder is used as the ferromagnetic powder is as follows.

An activation volume of the ε-iron oxide powder is preferably in a range of 300 to 1,500 $nm^3$. A particulate ε-iron oxide powder having the activation volume in the range described above is suitable for manufacturing the magnetic tape MT exhibiting excellent electromagnetic conversion characteristics. The activation volume of the ε-iron oxide powder is preferably equal to or larger than 300 $nm^3$, and can be, for example, equal to or larger than 500 $nm^3$. From a viewpoint of further improving the electromagnetic conversion characteristics, the activation volume of the ε-iron oxide powder is preferably equal to or smaller than 1400 $nm^3$, more preferably equal to or smaller than 1300 $nm^3$, still more preferably equal to or smaller than 1200 $nm^3$, yet more preferably equal to or smaller than 1100 $nm^3$.

An example of an index of the reduction of thermal fluctuation, that is, improvement in thermal stability includes the anisotropy constant Ku. The ε-iron oxide powder can preferably have Ku equal to or larger than $3.0 \times 10^4$ $J/m^3$, and more preferably have Ku equal to or larger than $8.0 \times 10^4$ $J/m^3$. In addition, Ku of the ε-iron oxide powder can be, for example, equal to or smaller than $3.0 \times 10^5$ $J/m^3$. However, since a higher Ku means that the thermal stability is higher, which is preferable, Ku is not limited to the exemplified value.

From a viewpoint of increasing a playback output in a case where the data recorded on the magnetic tape MT is played back, it is desirable that mass magnetization σs of the ferromagnetic powder included in the magnetic tape MT is high. In regards to this point, in one aspect, σs of the ε-iron oxide powder can be equal to or larger than 8 $A \cdot m^2/kg$ and equal to or larger than 12 $A \cdot m^2/kg$. On the other hand, from a viewpoint of noise reduction, the σs of the ε-iron oxide powder is preferably equal to or smaller than 40 $A \cdot m^2/kg$ and more preferably equal to or smaller than 35 $A \cdot m^2/kg$.

In a case where the magnetic tape contains the ε-iron oxide powder in the magnetic layer, the anisotropic magnetic field Hk of the magnetic layer is preferably equal to or larger than 18 kOe, more preferably equal to or larger than 30 kOe, and still more preferably equal to or larger than 38 kOe. The anisotropic magnetic field Hk of the magnetic layer is preferably equal to or smaller than 100 kOe, more preferably equal to or smaller than 90 kOe, and still more preferably equal to or smaller than 75 kOe. In the magnetic layer containing ε-iron oxide powder, the direction of magnetization hard axis of the magnetic layer is an in-plane direction.

In the present embodiment, average particle sizes of various powders such as the ferromagnetic powder and the like are values measured by the following method with a transmission electron microscope, unless otherwise noted.

The powder is imaged at an imaging magnification ratio of 100,000 with the transmission electron microscope and the image is printed on photographic paper so as to have a total magnification ratio of 500,000 to obtain a photograph of particles constituting the powder. A target particle is selected from the obtained photograph of the particles and an outline of the particle is traced with a digitizer to measure a size of the particle (primary particle). The primary particle is an independent particle that is not aggregated.

The measurement described above is made on 500 particles randomly extracted. An arithmetical mean of the particle sizes of 500 particles obtained as described above is an average particle size of the powder. As the transmission electron microscope, a transmission electron microscope H-9000 manufactured by Hitachi, Ltd. can be used, for example. The measurement of the particle size can be performed by well-known image analysis software, for example, image analysis software KS-400 manufactured by Carl Zeiss. The average particle size shown in the Examples described below is a value measured by using the transmission electron microscope H-9000 manufactured by Hitachi, Ltd. as the transmission electron microscope and the image analysis software KS-400 manufactured by Carl Zeiss as the image analysis software, unless otherwise noted. In the present disclosure and the present specification, the powder means an aggregate of a plurality of particles. For example, the ferromagnetic powder means an aggregate of a plurality of ferromagnetic particles. The aggregate of the plurality of particles is not limited to an aspect in which particles constituting the aggregate directly contact with each other, but also includes an aspect in which a binding agent, an additive, or the like described below is interposed between the particles. The term of particle may be used for representing the powder.

As a method of collecting a sample powder from the magnetic recording medium in order to measure the particle size, a method disclosed in a paragraph 0015 of JP2011-048878A can be employed, for example.

In the present embodiment, the size of the particle (particle size) constituting the powder is represented by (1) a length of a long axis constituting the particle, that is, a long axis length in a case where a shape of the particle observed in the above particle photograph is needle-shaped, spindle-shaped, columnar, or the like (however, a height is larger than a maximum long diameter of a bottom surface), (2) a maximum long diameter of a plate surface or a bottom surface in a case where the shape of the particle observed in the above particle photograph is plate-shaped or columnar (however, a thickness or a height is smaller than the maximum long diameter of the plate surface or the bottom surface), (3) a circle equivalent diameter in a case where the shape of the particle observed in the above particle photograph is spherical, polyhedral, unspecified, or the like and the long axis constituting the particle cannot be specified from the shape, unless otherwise noted. The circle equivalent diameter refers to a diameter obtained by a circle projection method.

An average needle-shaped ratio of the powder indicates an arithmetical mean of values obtained for 500 particles by measuring a length of a short axis, that is, a short axis length of the particle in the measurement described above and by obtaining a value of (long axis length/short axis length) of each particle. Unless otherwise noted, the short axis length is the length of the short axis constituting the particle in the case of (1) as the definition of the particle size and is a thickness or a height in the case of (2) as the same definition. In the case of (3) as the same definition, since the long axis and the short axis are not distinguished, the value of (long axis length/short axis length) is assumed as one, for convenience.

Unless otherwise noted, in a case where the shape of the particle is specified, for example, the average particle size is an average long axis length in the case of (1) as the definition of the particle size and the average particle size is an average plate diameter in the case of (2) as the same definition. In the case of (3) as the same definition, the average particle size is an average diameter (also referred to as an average particle diameter).

The content (filling percentage) of the ferromagnetic powder in the magnetic layer is preferably in a range of 50% to 90% by mass and more preferably in a range of 60% to 90% by mass. Components of the magnetic layer other than the ferromagnetic powder are at least a binding agent and may optionally include one or more types of additional additives. A high filling percentage of the ferromagnetic powder in the magnetic layer is preferable from the viewpoint of improvement in the recording density.

(Binding Agent and Curing Agent)

The magnetic recording medium is a coating-type magnetic recording medium, and the magnetic layer contains a binding agent. The binding agent is one or more types of resins. Various resins usually used as the binding agent of the coating-type magnetic recording medium can be used as the binding agent. For example, as the binding agent, a resin selected from a polyurethane resin, a polyester resin, a polyamide resin, a vinyl chloride resin, an acrylic resin obtained by copolymerizing styrene, acrylonitrile, or methyl methacrylate, a cellulose resin such as nitrocellulose, an epoxy resin, a phenoxy resin, and a polyvinylalkylal resin such as polyvinyl acetal or polyvinyl butyral can be used alone or a plurality of resins can be mixed and used. Among these resins, the polyurethane resin, the acrylic resin, the cellulose resin, and the vinyl chloride resin are preferable. These resins may be homopolymers or copolymers. These resins can be used as the binding agent also in a non-magnetic layer and/or a back coating layer described below. For the binding agent described above, description disclosed in paragraphs 0028 to 0031 of JP2010-24113A can also be referred to. The binding agent may be a radiation curable resin such as an electron beam curable resin. For details of the radiation curable resin, descriptions disclosed in paragraphs 0044 to 0045 of JP2011-048878A can be referred to.

An average molecular weight of the resin used as the binding agent can be, for example, 10,000 to 200,000 as a weight-average molecular weight. The weight-average molecular weight in the present disclosure and the present specification is a value obtained by converting a value measured by gel permeation chromatography (GPC) under the following measurement conditions into polystyrene. The weight-average molecular weight of the binding agent shown in Examples described below is a value obtained by converting a value measured under the following measurement conditions into polystyrene.

GPC device: HLC-8120 (manufactured by Tosoh)

Column: TSK gel Multipore HXL-M (manufactured by Tosoh, 7.8 mm inner diameter (ID)×30.0 cm)

Eluent: tetrahydrofuran (THF)

A curing agent can also be used together with the binding agent. In one aspect, the curing agent can be a thermosetting compound that is a compound in which a curing reaction (crosslinking reaction) proceeds due to heating. In another aspect, the curing agent can be a photocurable compound in which the curing reaction (crosslinking reaction) proceeds due to light irradiation. At least a part of the curing agent may be included in the magnetic layer in a state of being reacted (crosslinked) with other components such as the binding agent, with proceeding of the curing reaction in a manufacturing step of the magnetic recording medium. The preferred curing agent is the thermosetting compound, and polyisocyanate is suitable. For details of the polyisocyanate, descriptions disclosed in paragraphs 0124 and 0125 of JP2011-216149A can be referred to, for example. A content of the curing agent in a composition for magnetic layer forming can be, for example, 0 to 80.0 parts by mass with respect to 100.0 parts by mass of the binding agent and can be preferably 50.0 to 80.0 parts by mass, from a viewpoint of improvement in strength of each layer such as the magnetic layer.

(Other Components)

The magnetic layer may include one or more types of additives as necessary, together with the various components described above. As the additive, a commercially available product can be appropriately selected and used according to the desired properties. Alternatively, a compound synthesized by a well-known method can be used as the additive. An example of the additive includes the curing agent. Examples of the additive that may be contained the magnetic layer include a non-magnetic filler, a lubricant, a dispersing agent, a dispersing assistant, an antibacterial agent, an antistatic agent, and an antioxidant. The non-magnetic filler is synonymous with a non-magnetic particle or a non-magnetic powder. Examples of the non-magnetic filler include a projection forming agent and a non-magnetic filler capable of functioning as an abrasive agent (hereinafter, referred to as "abrasive agent"). As the additive, well-known additives such as various polymers described in paragraphs 0030 to 0080 of JP2016-051493A can also be used.

As the projection forming agent, which is one aspect of the non-magnetic filler, a particle of an inorganic substance can be used, a particle of an organic substance can be used, or a composite particle of the inorganic substance and the organic substance can be used. Examples of the inorganic substance include an inorganic oxide such as a metal oxide, a metal carbonate, a metal sulfates, a metal nitride, a metal carbide, and a metal sulfide. The inorganic oxide is preferable. In one aspect, the projection forming agent can be an inorganic oxide-based particle. The term "based" is used to mean "contained". One aspect of the inorganic oxide-based particle is a particle made of the inorganic oxide. Another aspect of the inorganic oxide-based particles is a composite particle of the inorganic oxide and the organic substance, and specific examples thereof include a composite particle of the inorganic oxide and a polymer. Examples of such particles include a particle in which the polymer is bonded to a surface of the inorganic oxide-based particle.

It is possible to control $S_{0.5}$ mainly by a particle size of the projection forming agent. An average particle size of the projection forming agent is, for example, 30 to 300 nm and preferably 40 to 200 nm. It is possible to control $S_{0.5}$ mainly by the manufacturing condition of the magnetic recording medium. On the other hand, it is possible to control $S_{13.5}$ by a shape of the projection forming agent in addition to the particle size of the projection forming agent. A pushing resistance that acts in a case where a large pressure is applied is smaller as the particle shape is closer to a true sphere. Therefore, the projection becomes easy to be pushed into the magnetic layer, and $S_{13.5}$ tends to be small. On the contrary, in a case where the particle has a shape distant from the true sphere, for example, a so-called irregular shape, a large pushing resistance tends to act in the case where the large pressure is applied. Therefore, the projection becomes difficult to be pushed into the magnetic layer, and $S_{13.5}$ tends to be large. A particle having an inhomogeneous particle surface and low surface smoothness is also likely to have the large pushing resistance in the case where the large pressure is applied. Therefore, the projection becomes difficult to be pushed into the magnetic layer, and $S_{13.5}$ tends to be large. By controlling $S_{0.5}$ and $S_{13.5}$, the difference ($S_{0.5}$-$S_{13.5}$) can be set to 3.0 nm or less.

The abrasive agent, which is another aspect of the non-magnetic filler, is preferably the non-magnetic powder having a Mohs hardness of more than 8 and more preferably the non-magnetic powder having a Mohs hardness of 9 or more. On the contrary, the Mohs hardness of the projection forming agent can be, for example, 8 or less or 7 or less. A maximum value of the Mohs hardness is 10 for diamond. Examples of the abrasive agent include powders of alumina ($Al_2O_3$), silicon carbide, boron carbide ($B_4C$), $SiO_2$, TiC chromium oxide ($Cr_2O_3$), cerium oxide, zirconium oxide ($ZrO_2$), iron oxide, and diamond. The powders of alumina such as α-alumina and silicon carbide are preferable among the above. An average particle size of the abrasive agent is, for example, 30 to 300 nm and preferably 50 to 200 nm.

From a viewpoint that the projection forming agent and the abrasive agent can exhibit their functions better, the content of the projection forming agent in the magnetic layer is preferably 1.0 to 4.0 parts by mass and more preferably 1.5 to 3.5 parts by mass with respect to 100.0 parts by mass of the ferromagnetic powder. On the other hand, the content of the abrasive agent in the magnetic layer is preferably 1.0 to 20.0 parts by mass, more preferably 3.0 to 15.0 parts by mass, and still more preferably 4.0 to 10.0 parts by mass with respect to 100.0 parts by mass of the ferromagnetic powder.

As an example of the additive that may be used for the magnetic layer containing the abrasive agent, the dispersing agent described in paragraphs 0012 to 0022 of JP2013-131285A can be used to improve dispersibility of the abrasive agent in the composition for magnetic layer forming. For the dispersing agent, a description disclosed in paragraphs 0061 and 0071 of JP2012-133837A can be referred to. The dispersing agent may be contained in the non-magnetic layer. For the dispersing agent that may be contained in the non-magnetic layer, a description disclosed in a paragraph 0061 of JP2012-133837A can be referred to.

Examples of the lubricant, which is one aspect of the additive that may be contained in the magnetic layer, include one or more types of lubricants selected from the group consisting of a fatty acid, a fatty acid ester, and a fatty acid amide. The $S_{0.5}$ and $S_{13.5}$ are values measured after the n-hexane cleaning. In a case where a liquid film of the lubricant is present on the magnetic layer surface that is pressed during the spacing measurement, the measured spacing becomes narrower by a thickness of the liquid film. On the contrary, it is presumed that the lubricant that may present as the liquid film during the pressing can be removed by the n-hexane cleaning. Therefore, with the measurement of the spacing after the n-hexane cleaning, it is considered that the measured value of the spacing can be obtained as a value that corresponds well with a presence state of the projection (height of projection) on the magnetic layer surface.

Examples of the fatty acid include a lauric acid, a myristic acid, a palmitic acid, a stearic acid, an oleic acid, a linoleic acid, a linolenic acid, a behenic acid, an erucic acid, and an elaidic acid. The stearic acid, the myristic acid, and the palmitic acid are preferable, and the stearic acid is more preferable. The fatty acid may be contained in the magnetic layer in a form of a salt such as a metal salt.

Examples of the fatty acid ester include esters such as the lauric acid, the myristic acid, the palmitic acid, the stearic acid, the oleic acid, the linoleic acid, the linolenic acid, the behenic acid, the erucic acid, and the elaidic acid. Specific examples thereof include, for example, butyl myristic acid, butyl palmitic acid, butyl stearic acid (butyl stearate), neopentyl glycol dioleate, sorbitan monostearate, sorbitan distearate, sorbitan tristearate, oleyl oleic acid, isocetyl stearic acid, isotridecyl stearic acid, octyl stearic acid, isooctyl stearic acid, amyl stearic acid, and butoxyethyl stearic acid.

Examples of the fatty acid amide include amides of the above various fatty acids, such as lauric acid amide, myristic acid amide, palmitic acid amide, and stearic acid amide.

For the fatty acid and a derivative of the fatty acid (amide, ester, and the like), a fatty acid-derived site of the fatty acid derivative preferably has the same or similar structure as the fatty acid used in combination. For example, in a case where stearic acid is used as the fatty acid, it is preferable to use a stearic acid ester and/or the stearic acid amide, as an example.

A content of the fatty acid of the composition for magnetic layer forming is, for example, 0 to 10.0 parts by mass, preferably 0.1 to 10.0 parts by mass, and more preferably 1.0 to 7.0 parts by mass with respect to 100.0 parts by mass of the ferromagnetic powder. A content of the fatty acid ester of the composition for magnetic layer forming is, for example, 0 to 10.0 parts by mass, preferably 0.1 to 10.0 parts by mass, and more preferably 1.0 to 7.0 parts by mass with respect to 100.0 parts by mass of the ferromagnetic powder. A content of the fatty acid amide of the composition for magnetic layer forming is, for example, 0 to 3.0 parts by mass, preferably 0 to 2.0 parts by mass, and more preferably 0 to 1.0 parts by mass with respect to 100.0 parts by mass of the ferromagnetic powder.

In a case where the magnetic recording medium has the non-magnetic layer between the non-magnetic support and the magnetic layer, the content of the fatty acid of a composition for non-magnetic layer forming is, for example, 0 to 10.0 parts by mass, preferably 1.0 to 10.0 parts by mass, and more preferably 1.0 to 7.0 parts by mass with respect to 100.0 parts by mass of the non-magnetic powder. A content of the fatty acid ester of the composition for non-magnetic layer forming is, for example, 0 to 15.0 parts by mass and preferably 0.1 to 10.0 parts by mass with respect to 100.0 parts by mass of the non-magnetic powder. A content of the fatty acid amide of the composition for non-magnetic layer forming is, for example, 0 to 3.0 parts by mass and preferably 0 to 1.0 parts by mass with respect to 100.0 parts by mass of the non-magnetic powder.

<Non-Magnetic Layer>

Next, the non-magnetic layer will be described. The magnetic recording medium may have the magnetic layer directly on the surface of the non-magnetic support or may have the non-magnetic layer containing the non-magnetic powder and the binding agent between the non-magnetic support and the magnetic layer. The non-magnetic powder used for the non-magnetic layer may be an inorganic substance powder (inorganic powder) or an organic substance powder (organic powder). The carbon black and the like can be used. Examples of the inorganic powder include a metal, a metal oxide, a metal carbonate, a metal sulfate, a metal nitride, a metal carbide, and a metal sulfide. These non-magnetic powders can be purchased as a commercially available product or can be produced by a well-known method. For details thereof, descriptions disclosed in paragraphs 0146 to 0150 of JP2011-216149A can be referred to. For the carbon black that can be used in the non-magnetic layer, descriptions disclosed in paragraphs 0040 and 0041 of JP2010-24113A can be referred to. A content (filling percentage) of the non-magnetic powder of the non-magnetic layer is preferably in a range of 50% to 90% by mass and more preferably in a range of 60% to 90% by mass.

In regards to other details of the binding agent and the additive of the non-magnetic layer, the well-known technique regarding the non-magnetic layer can be applied. In regards to the type and the content of the binding agent and the type and the content of the additive, for example, the well-known technique regarding the magnetic layer can be applied.

The non-magnetic layer of the magnetic recording medium also includes a substantially non-magnetic layer containing a small amount of ferromagnetic powder, for example, as an impurity or intentionally, together with the non-magnetic powder. The substantially non-magnetic layer is a layer having residual magnetic flux density equal to or smaller than 10 mT, having coercivity equal to or smaller than 7.96 kA/m (100 Oe), or having residual magnetic flux density equal to or smaller than 10 mT and coercivity equal to or smaller than 7.96 kA/m (100 Oe). It is preferable that the non-magnetic layer does not have the residual magnetic flux density and the coercivity.

<Non-Magnetic Support>

Next, the non-magnetic support will be described. Examples of the non-magnetic support (hereinafter, also simply referred to as "support") include well-known components such as polyethylene terephthalate, polyethylene naphthalate, polyamide, polyamide imide, and aromatic polyamide that are subjected to biaxial stretching. Among the above, the polyethylene terephthalate, the polyethylene naphthalate, and the polyamide are preferable. Corona discharge, plasma treatment, easy-bonding treatment, or heat treatment may be performed in advance on these supports.

<Back Coating Layer>

The magnetic recording medium can also include the back coating layer containing the non-magnetic powder and the binding agent on a surface side of the non-magnetic support opposite to a surface side having the magnetic layer. The back coating layer preferably contains any one or both of the carbon black and the inorganic powder. In regards to the binding agent of the back coating layer and various additives that may be randomly included therein, a well-known technique regarding the back coating layer can be applied, and a well-known technique regarding formulation of the magnetic layer and/or the non-magnetic layer can also be applied. For example, for the back coating layer, descriptions disclosed in paragraphs 0018 to 0020 of JP2006-331625A and column 4, line 65 to column 5, line 38 of U.S. Pat. No. 7,029,774B can be referred to.

<Various Thicknesses>

A thickness of the non-magnetic support is, for example, in a range of 3.0 to 80.0 µm, preferably in a range of 3.0 to 50.0 µm, and more preferably in a range of 3.0 to 10.0 µm.

A thickness of the magnetic layer is preferably equal to or less than 100 nm from a viewpoint of high-density recording required in recent years. The thickness of the magnetic layer is more preferably in a range of 10 nm to 100 nm and still more preferably in a range of 20 to 90 nm. The magnetic layer may be separated into two or more layers having different magnetic properties as long as the magnetic layer has at least one layer, and a configuration regarding a well-known multilayered magnetic layer can be applied. A thickness of the magnetic layer in a case where the magnetic layer is separated into two or more layers is a total thickness of the layers.

The thickness of the non-magnetic layer is, for example, 0.1 to 1.5 µm and preferably 0.1 to 1.0 µm.

A thickness of the back coating layer is preferably equal to or smaller than 0.9 µm and more preferably in a range of 0.1 to 0.7 µm.

The thicknesses of each layer of the magnetic recording medium and the non-magnetic support can be obtained by a well-known film thickness measurement method. For example, a cross section of the magnetic recording medium in a thickness direction is exposed by a well-known method of an ion beam or microtome, and then the exposed cross section is observed with a scanning electron microscope, as an example. In the cross section observation, it is possible to obtain various thicknesses as a thickness obtained at one portion, or an arithmetical mean of thicknesses obtained at a plurality of portions of two or more portions, for example, two portions that are randomly extracted. Alternatively, the thickness of each layer may be obtained as a designed thickness calculated according to a manufacturing condition.

<Manufacturing Method>

(Preparation of Composition for Each Layer Forming)

The composition for forming the magnetic layer and the non-magnetic layer or the back coating layer usually contains a solvent together with the various components described above. Various organic solvents generally used for manufacturing the coating-type magnetic recording medium can be used as the solvent. Among them, from a viewpoint of solubility of a binding agent usually used for the coating-type magnetic recording medium, a composition for each layer forming preferably contains one or more types of ketone solvents such as acetone, methyl ethyl ketone, methyl isobutyl ketone, diisobutyl ketone, cyclohexanone, isophorone, and tetrahydrofuran. An amount of the solvent in the composition for each layer forming is not particularly limited and can be the same as that of the composition for each layer forming of a normal coating-type magnetic recording medium. A step of preparing the composition for each layer forming can usually include at least a kneading step, a dispersion step, and a mixing step provided before and after these steps as necessary. Each step may be divided into two or more stages. A component used in preparing the composition for each layer forming may be added at the head or in the middle of any step. Each component may be added separately in two or more steps. For example, the binding agent may be divided and added in the kneading step, the dispersion step, and the mixing step for adjusting the viscosity after dispersion. In the manufacturing step of the magnetic recording medium, a well-known manufacturing technique in the related art can be used in some or all of the steps. In the kneading step, it is preferable to use a kneader having a strong kneading force such as an open kneader, a continuous kneader, a pressurized kneader, and an extruder. Details of these kneading treatments are described in JP1989-106338A (JP-H01-106338A) and JP1989-79274A (JP-H01-79274A). Glass beads and/or other beads can be used to disperse the composition for each layer forming. Zirconia beads, titania beads, and steel beads, which are dispersing beads having a high specific gravity, are suitable as such dispersing beads. It is preferable to use these dispersing beads by optimizing the particle size (bead diameter) and the filling percentage. A well-known disperser can be used. The composition for each layer forming may be filtered by a well-known method before being subjected to a coating step. The filtration can be performed, for example, by filter filtration. For example, a filter having a pore diameter of 0.01 to 3 µm (for example, a glass fiber filter or a polypropylene filter) can be used as the filter used for filtration.

(Coating Step)

The magnetic layer can be formed, for example, by directly coating the composition for magnetic layer forming onto the non-magnetic support or by coating multiple layers sequentially or simultaneously with the composition for non-magnetic layer forming. In the aspect of performing an alignment treatment, the alignment treatment is performed on a coating layer in an alignment zone while the coating layer of the composition for magnetic layer forming is in a wet state. For the alignment treatment, various well-known techniques such as a description in paragraph 0052 of JP2010-24113A can be applied. For example, a vertical alignment treatment can be performed by a well-known method such as a method using a heteropolar magnet. In the alignment zone, a drying rate of the coating layer can be controlled by a temperature and an air volume of the drying air and/or a transportation speed in the alignment zone. Alternatively, the coating layer may be preliminarily dried before being transported to the alignment zone.

The back coating layer can be formed by coating a composition for back coating layer forming to a side opposite to a side having the magnetic layer of the non-magnetic support (or where the magnetic layer is subsequently provided). For details of the coating for forming each layer, a paragraph 0066 of JP2010-231843A can be referred to.

(Other Steps)

After the coating step is performed, a calender treatment is usually performed to improve the surface smoothness of the magnetic recording medium. As a calender condition is strengthened, the height of the projection on the magnetic layer surface formed by the projection forming agent tends to decrease in the manufactured magnetic recording medium. Accordingly, for example, $S_{0.5}$ can be reduced. Examples of the calender condition include a type and the number of stages of a calender roll, a calender pressure, a calender temperature (surface temperature of calender roll), and a calender speed. The calender pressure is, for example, 200 to 500 kN/m and preferably 250 to 350 kN/m. The calender temperature is, for example, 70° C. to 120° C. and preferably 80° C. to 100° C. The calender speed is, for example, 50 to 300 m/min and preferably 80 to 200 m/min. The magnetic layer surface tends to be smoothed as the surface of the roll as the calender roll is harder and as the number of stages of the calender roll is increased. Therefore, the height of the projection on the magnetic layer surface can be adjusted according to a combination of calender rolls and the number of stages thereof.

For other various steps for manufacturing the magnetic recording medium, paragraphs 0067 to 0070 of JP2010-231843A can be referred to.

(Forming of Servo Pattern)

A servo pattern can be formed on the magnetic tape manufactured as described above by a well-known method in order to enable tracking control of the magnetic head in a magnetic recording/playback device, control of a running speed of the magnetic tape, and the like. The "forming of servo pattern" can also be referred to as "recording of servo signal". The forming of the servo pattern will be described below.

The servo pattern is usually formed along a longitudinal direction of the magnetic tape. Examples of a control (servo control) method using the servo signal include timing-based servo (TBS), amplitude servo, and frequency servo.

As indicated in European computer manufacturers association (ECMA)-319, the timing-based servo method is employed in a magnetic tape (generally referred to as "LTO tape") conforming to a linear tape-open (LTO) standard. In this timing-based servo method, the servo pattern is configured of a pair of mutually non-parallel magnetic stripes (also referred to as "servo stripes") that are continuously arranged in the longitudinal direction of the magnetic tape. In the present disclosure and the present specification, the term "timing-based servo pattern" refers to a servo pattern that enables head tracking in a servo system of the timing-based servo method. As described above, the reason why the servo pattern is configured of the pair of mutually non-parallel magnetic stripes is to teach a passing position to a servo signal reading element passing on the servo pattern. Specifically, the pair of magnetic stripes are formed such that their intervals change continuously along a width direction of the magnetic tape and the servo signal reading element reads the intervals to know a relative position between the servo pattern and the servo signal reading element. This relative position information allows tracking of a data track. Therefore, a plurality of servo tracks are usually set on the servo pattern along the width direction of the magnetic tape.

A servo band is configured of servo signals continuous in the longitudinal direction of the magnetic tape. A plurality of servo bands are usually provided on the magnetic tape. The number of servo bands is five in LTO tape, for example. An area sandwiched between two adjacent servo bands is referred to as a data band. The data band is configured of a plurality of pieces of data tracks, and each piece of data track corresponds to each servo track.

In one aspect, information indicating a servo band number (also referred to as "servo band identification (ID)" or "unique data band identification method (UDIM) information") is embedded in each servo band, as shown in JP2004-318983A. The servo band ID is recorded by shifting a specific one of a plurality of pairs of servo stripes in the servo band such that a position thereof is displaced relative to the longitudinal direction of the magnetic tape. Specifically, a method of shifting the specific one of the plurality of pairs of servo stripes is changed for each servo band. Accordingly, since the recorded servo band ID is unique for each servo band, it is possible to uniquely specify the servo band by simply reading one servo band with the servo signal reading element.

A staggered method as indicated in ECMA-319 can be used as a method of uniquely specifying the servo band. In this staggered method, a group of the pair of mutually non-parallel magnetic stripes (servo stripes) that are continuously arranged in the longitudinal direction of the magnetic tape is recorded to be shifted in the longitudinal direction of the magnetic tape for each servo band. This combination of shifting methods between the adjacent servo bands is unique to the entire magnetic tape. Therefore, it is possible to uniquely specify the servo band in a case where two servo signal reading elements read the servo pattern.

As indicated in ECMA-319, information indicating the position of the magnetic tape in the longitudinal direction (also referred to as "longitudinal position (LPOS) information") is usually embedded in each servo band. This LPOS information is also recorded by shifting the position of the pair of servo stripes in the longitudinal direction of the magnetic tape, like the UDIM information. However, the same signal is recorded in each servo band in the LPOS information, unlike the UDIM information.

It is also possible to embed another piece of information different from the above UDIM information and LPOS information in the servo band. In this case, the embedded information may be different for each servo band such as UDIM information or may be common to all servo bands such as LPOS information. It is possible to employ a method other than the above as a method of embedding the information in the servo band. For example, a predetermined code may be recorded by thinning out a predetermined pair from the group of the pair of servo stripes.

A head for servo pattern forming is referred to as a servo light head. The servo light head has a pair of gaps corresponding to the pair of magnetic stripes as many as the number of servo bands. A core and a coil are usually connected to each pair of gaps, and a magnetic field generated in the core can generate a leakage magnetic field in the pair of gaps with supplying of a current pulse to the coil. In the case of the forming of the servo pattern, a magnetic pattern corresponding to the pair of gaps is transferred to the magnetic tape by inputting the current pulse while running the magnetic tape on the servo light head, and thus the servo pattern can be formed. A width of each gap can be appropriately set according to the density of the servo pattern to be formed. The width of each gap can be set to, for example, 1 µm or less, 1 to 10 µm, 10 µm or more, and the like.

Before the servo pattern is formed on the magnetic tape, a demagnetization (erasing) treatment is usually performed on the magnetic tape. This erasing treatment can be performed by applying a uniform magnetic field to the magnetic tape, using a DC magnet or an AC magnet. The erasing treatment includes direct current (DC) erasing and alternating current (AC) erasing. The AC erasing is performed by gradually reducing the strength of the magnetic field while reversing a direction of the magnetic field applied to the magnetic tape. On the other hand, the DC erasing is performed by applying a unidirectional magnetic field to the magnetic tape. There are two more methods for the DC erasing. A first method is horizontal DC erasing, which applies the unidirectional magnetic field along the longitudinal direction of the magnetic tape. A second method is vertical DC erasing, which applies the unidirectional magnetic field along a thickness direction of the magnetic tape. The erasing treatment may be performed on the entire magnetic tape or may be performed on each servo band of the magnetic tape.

A direction of the magnetic field of the servo pattern to be formed is determined by a direction of the erasing. For example, in a case where the horizontally DC erasing is performed on the magnetic tape, the servo pattern is formed such that the direction of the magnetic field is opposite to the direction of the erasing. Accordingly, an output of the servo signal obtained by reading the servo pattern can be increased. As indicated in JP2012-53940A, in a case where the magnetic pattern is transferred to the magnetic tape subjected to the vertical DC erasing using the gap, the servo signal obtained by reading the formed servo pattern has a unipolar pulse shape. On the other hand, in a case where the magnetic pattern is transferred to the magnetic tape subjected to the horizontal DC erasing using the gap, the servo signal obtained by reading the formed servo pattern has a bipolar pulse shape.

Next, an act in a case where the object is recorded on the magnetic tape T of the information processing device 12 according to the present embodiment will be described with reference to FIG. 7. The CPU 20 executes the recording program 30 to execute recording processing shown in FIG. 7. The recording processing shown in FIG. 7 is executed in a case where the user inputs the information representing the hierarchical relationship of the hierarchy through the input unit 24 and an instruction to record the object is input, for example. For example, in a case where the information indicating the hierarchical relationship of the hierarchy is set in advance by the user and a total size of the data stored in the data cache 44 is equal to or larger than a threshold value, the recording processing shown in FIG. 7 is executed.

In step S10 of FIG. 7, the reception unit 40 receives the information representing the hierarchical relationship of the hierarchy with the unit of the group that classifies each object, as described above. In step S12, the generation unit 41 generates the hierarchy of the group that classifies each object from the metadata of each of the plurality of objects to be recorded according to the information representing the hierarchical relationship received by the processing of step S10, as described above.

In step S14, the control unit 42 controls the recording of the plurality of objects included in the group of the highest hierarchy for each group of the highest hierarchy generated by the processing of step S12 on the magnetic tape T, in a recording order according to an order from the upper hierarchy to the lower hierarchy, as described above. The control unit 42 controls the recording of the group hierarchy generated by the processing of step S12 in the recording area for recording the management information of the magnetic tape T. Further, the control unit 42 also controls the recording of a recording position of the head object of each group as a recording position of each group on the magnetic tape T in the recording area for recording the management information. In a case where the processing of step S14 ends, the main recording processing ends.

Next, a functional configuration of the information processing device 12 in a case where the object is read from the magnetic tape T on which the object is recorded as described above will be described with reference to FIG. 8. As shown in FIG. 8, the information processing device 12 includes a reception unit 50 and a reading unit 52. The CPU 20 executes the reading program 32 to function as the reception unit 50 and the reading unit 52.

The reception unit 50 receives the identification information of the object to be read. In the present embodiment, the reception unit 50 receives the identification information of the group to which the object to be read such as "patient A" or "2018 Jul. 1" belongs, as the identification information of the object to be read. The identification information received by the reception unit 50 may be the identification information of one group such as "patient A" or the identification information of a plurality of groups such as "patient A" and "2018 Jul. 1". This identification information is input by the user as a search condition, for example.

The reading unit 52 reads an object according to the identification information received by the reception unit 50 from the magnetic tape T on which the plurality of objects are recorded by the recording processing shown in FIG. 7.

Specifically, the reading unit 52 reads the group hierarchy and the recording position of the object from the recording area for recording the management information on the magnetic tape T. The reading unit 52 specifies the recording position on the magnetic tape T corresponding to the object according to the identification information received by the reception unit 50, using the read group hierarchy and recording position of the object. The reading unit 52 reads the object corresponding to the identification information received by the reception unit 50 from the specified recording position.

As a specific example, a case where the object is recorded on the magnetic tape T in the recording order shown in FIG. 6 and the user wants to refer to the object of "patient A" will be described. In this case, the "patient A" is designated as the object identification information by the user and is received by the reception unit 50.

In this case, the reading unit 52 can continuously read all the objects included in the "patient A" from the head object of the "patient A" in one reading operation. Therefore, the group hierarchy is set in order of high possibility of being read in order from the upper hierarchy, and thus more objects can be read at one time. As a result, it is possible to shorten a reading time of the object recorded on the magnetic tape T.

Next, an act in a case where the object is read from the magnetic tape T of the information processing device 12 according to the present embodiment will be described with reference to FIG. 9. The CPU 20 executes the reading program 32 to execute reading processing shown in FIG. 9. The reading processing shown in FIG. 9 is executed, for example, in a case where the identification information of the object to be read is input by the user through the input unit 24.

In step S20 of FIG. 9, the reception unit 50 receives the identification information of the object to be read, as described above.

In step S22, the reading unit 52 reads the group hierarchy and the recording position of the object from the recording area for recording the management information on the magnetic tape T, as described above. The reading unit 52 specifies the recording position on the magnetic tape T corresponding to the object according to the identification information received by the processing of step S20, using the read group hierarchy and recording position of the object. The reading unit 52 reads the object corresponding to the identification information received by the processing of step S20 from the specified recording position. In a case where the processing of step S22 ends, the main recording processing ends.

Second Embodiment

A second embodiment of the technique of the present disclosure will be described. In the second embodiment, an embodiment in which the same data is recorded on each of a plurality of magnetic tapes T will be described. The configuration of the recording/reading system 10 (refer to FIG. 1) and the hardware configuration of the information processing device 12 (refer to FIG. 2) according to the second embodiment are the same as those in the first embodiment, and thus the description thereof will be omitted.

Next, a functional configuration in a case where the object is recorded on the magnetic tape T of the information processing device 12 according to the second embodiment will be described with reference to FIG. 3. The same reference numerals are assigned to the functional units having the same functions as the information processing device 12 according to the first embodiment, and the description thereof will be omitted. As shown in FIG. 3, the information processing device 12 includes a reception unit 40A, a generation unit 41A, and a control unit 42A. The CPU 20 executes the recording program 30 to function as the reception unit 40A, the generation unit 41A, and the control unit 42A.

The reception unit 40A has the following functions in addition to the functions of the reception unit 40 according to the first embodiment. The reception unit 40A receives the number of magnetic tapes T for recording the plurality of objects to be recorded, which are input by the user through the input unit 24. The number of the magnetic tapes T may be stored in advance in the storage unit 22 as a set value.

The generation unit 41A has the following functions in addition to the functions of the generation unit 41 according to the first embodiment. In a case where the number of magnetic tapes T received by the reception unit 40A is one, the generation unit 41A generates the group hierarchy in the same manner as the generation unit 41 according to the first embodiment.

On the other hand, in a case where the number of magnetic tapes T received by the reception unit 40A is two or more (that is, in a case where the plurality of objects are recorded on each of the plurality of magnetic tapes T), the generation unit 41A generates a plurality of hierarchies by making the hierarchical relationship of the hierarchy different corresponding to each of the number of magnetic tapes T received by the reception unit 40A.

As a specific example, a case where the reception unit 40A receives information representing the hierarchical relationship of the hierarchy shown in FIG. 4 and "two" is received as the number of magnetic tapes T will be described. In this case, the generation unit 41A generates, for example, the hierarchy shown in FIG. 5 as a first group hierarchy, which is the same as that of the first embodiment. Further, in this case, the generation unit 41A generates a hierarchy having a different hierarchical relationship of the hierarchy from the generated first hierarchy as a second group hierarchy. An example of the second group hierarchy is shown in FIG. 10. In the example shown in FIG. 10, the hierarchical relationship of the hierarchy between the patient name group and the diagnosis date group in the example shown in FIG. 5 is interchanged.

The control unit 42A has the following functions in addition to the functions of the control unit 42 according to the first embodiment. In a case where the number of magnetic tapes T received by the reception unit 40A is one, the control unit 42A performs the same control as the control unit 42 according to the first embodiment.

On the other hand, in the case where the number of magnetic tapes T received by the reception unit 40A is two or more, the control unit 42A controls the recording of the plurality of objects on each of the plurality of magnetic tapes in the same recording order as in the first embodiment according to each of the hierarchies generated by the generation unit 41A.

For example, in a case where the generation unit 41A generates the hierarchy shown in FIG. 5 and the hierarchy shown in FIG. 10, the control unit 42A controls the recording of the plurality of objects on a first magnetic tape T with a single recording instruction in the recording order shown in FIG. 6 according to the hierarchy shown in FIG. 5. Further, in this case, the control unit 42A controls the recording of the plurality of objects on a second magnetic tape T with a single recording instruction in the recording order shown in FIG. 11 according to the hierarchy shown in FIG. 10. In the example shown in FIG. 11, the objects are recorded on the magnetic tape T in the order from the left side to the right side of FIG. 11, as in the example shown in FIG. 6.

Next, an act in a case where the object is recorded on the magnetic tape T of the information processing device 12 according to the second embodiment will be described with reference to FIG. 12. The CPU 20 executes the recording program 30 to execute the recording processing shown in FIG. 12. The recording processing shown in FIG. 12 is executed, for example, in a case where the user inputs the information representing the hierarchical relationship of the hierarchy and the number of magnetic tapes T through the input unit 24 and the instruction to record the object is input.

Figure 12:
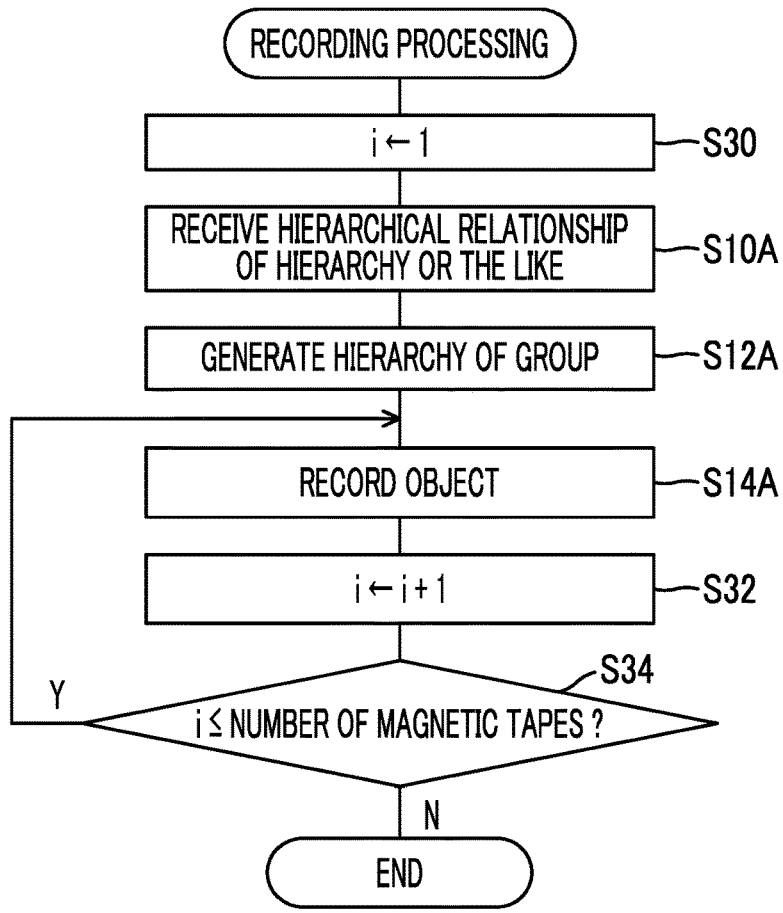
FIG. 12 is a flowchart showing an example of recording processing according to the second embodiment.

In step S30 of FIG. 12, the control unit 42A substitutes 1 for a variable i for a counter. In step S10A, the reception unit 40A receives the information representing the hierarchical relationship of the hierarchy with the unit of the group that classifies each object and the number of magnetic tapes T.

In step S12A, the generation unit 41A generates the hierarchy of the group that classifies each object from the metadata of each of the plurality of objects to be recorded according to the information representing the hierarchical relationship received by the processing of step S10A, as described above. In this case, the generation unit 41A generates the group hierarchy of the number of magnetic tapes T received by the processing of step S10A, as described above.

In step S14A, the control unit 42A controls the recording of the object on the magnetic tape T by performing the same processing as in step S14 of the first embodiment. In the case of this control, the control unit 42A uses an i-th hierarchy and an i-th magnetic tape T, which are generated by the processing of step S12A.

In step S32, the control unit 42A adds 1 to the variable i. In step S34, the control unit 42A determines whether or not the value of the variable i is equal to or less than the number of magnetic tapes T received by the processing of step S10A. In a case where this determination is affirmative, the processing returns to step S14A. In a case where the determination is negative, the recording processing ends. The processing of recording the plurality of objects on the plurality of magnetic tapes T may be performed in parallel using the plurality of tape drives 18.

Next, a functional configuration of the information processing device 12 in a case where the object is read from the magnetic tape T on which the object is recorded as described above will be described with reference to FIG. 8. The same reference numerals are assigned to the functional units having the same functions as the information processing device 12 according to the first embodiment, and the description thereof will be omitted. As shown in FIG. 8, the information processing device 12 includes the reception unit 50 and a reading unit 52A. The CPU 20 executes the reading program 32 to function as the reception unit 50 and the reading unit 52A.

The reading unit 52A has the following functions in addition to the functions of the reading unit 52 according to the first embodiment. In a case where there is one magnetic tape T on which the same plurality of objects are recorded, the reading unit 52A reads the object corresponding to the identification information received by the reception unit 50, similarly to the reading unit 52 according to the first embodiment.

In a case where there are a plurality of magnetic tapes T on which the same plurality of objects are recorded, the reading unit 52A reads the object from a magnetic tape T on which the object to be read is recorded in the highest hierarchy, among the plurality of magnetic tapes T. Specifically, the reading unit 52A reads the group hierarchy from the recording area for recording the management information in each magnetic tape T. The magnetic tape T in which the group corresponding to the identification information received by the reception unit 50 is in the highest hierarchy is specified, and the object is read from the specified magnetic tape T in the same manner as the reading unit 52 according to the first embodiment.

As a specific example, a case where there are two magnetic tapes T of a magnetic tape T on which the object is recorded according to the hierarchy shown in FIG. 5 and of a magnetic tape T on which the object is recorded according to the hierarchy shown in FIG. 10 and the user wants to refer to the object of "patient A" will be described.

In this case, the "patient A" is designated as the object identification information by the user and is received by the reception unit 50. In the hierarchy shown in FIG. 5, the "patient A" is the highest hierarchy. In the hierarchy shown in FIG. 10, the "patient A" is a second hierarchy from the top. Therefore, in this case, the reading unit 52A reads all the objects included in the "patient A" from the magnetic tape T on which the object is recorded according to the hierarchy shown in FIG. 5 in which the "patient A" is recorded in the highest hierarchy, among the two magnetic tapes T.

On the other hand, in a case where "2018 Jul. 1" is designated as the object identification information by the user, the reading unit 52A reads the object from the magnetic tape T shown below. That is, in this case, the reading unit 52A reads all the objects included in the "2018 Jul. 1" from the magnetic tape T on which the object is recorded according to the hierarchy shown in FIG. 10 in which the "2018 Jul. 1" is recorded in the highest hierarchy, among the two magnetic tapes T. Therefore, the objects to be read can be read from the magnetic tape T in a most organized state. As a result, it is possible to shorten the reading time of the object recorded on the magnetic tape T.

For example, in a case where the identification information of the same hierarchy between a plurality of magnetic tapes such as "medical image" and "diagnosis information", or "CT" and "MRI" is designated, it is not limited from which magnetic tape T the object is read. For example, the magnetic tape T to be read may be randomly determined, or the object may be read from a magnetic tape T having the smallest number of readings in the past.

Figure 13:
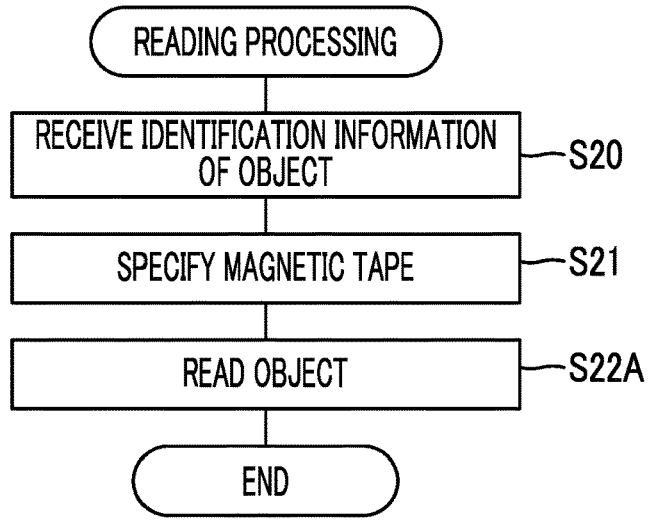
FIG. 13 is a flowchart showing an example of reading processing according to the second embodiment.

Next, an act in a case where the object is read from the magnetic tape T of the information processing device 12 according to the second embodiment will be described with reference to FIG. 13. The CPU 20 executes the reading program 32 to execute the reading processing shown in FIG. 13. The reading processing shown in FIG. 13 is executed, for example, in a case where the identification information of the object to be read is input by the user through the input unit 24. In a case where the object to be read is stored in one magnetic tape T, the processing is the same as the reading processing according to the first embodiment. Therefore, a case where the object to be read is stored in each of the plurality of magnetic tapes T will be described. In FIG. 13, the same reference numerals are assigned to steps of performing the same processing as in FIG. 9 and the description thereof will be omitted.

In step S21 of FIG. 13, the reading unit 52A specifies the magnetic tape T in which the group corresponding to the identification information received by the processing of step S20 is in the highest hierarchy, as described above.

In step S22A, the reading unit 52A performs the same processing as in step S22 according to the first embodiment to read the object corresponding to the identification information received by the processing of step S20 from the magnetic tape T specified by the processing of step S21. In a case where the processing of step S22A ends, the main recording processing ends.

In each of the above embodiments, the case where the magnetic tape is applied as the magnetic recording medium has been described, but the present disclosure is not limited thereto. A recording medium other than the magnetic tape may be applied as the magnetic recording medium. The magnetic recording medium of the present embodiment is suitable as various magnetic recording media (magnetic tape, disk-shaped magnetic recording medium (magnetic disk), and the like) used in a sliding-type magnetic recording/playback device. The sliding-type device refers to a device in which the magnetic layer surface and the magnetic head slide in contact with each other in a case where the information is recorded on the magnetic recording medium and the recorded information is read.

In the above embodiment, the information processing device 12 and the tape library 14 are described as separate bodies, but the present invention is not limited thereto. It can also be provided as a magnetic recording/reading device including the information processing device 12 and the tape library 14.

In the second embodiment, the case where the plurality of objects to be recorded are recorded on each of the plurality of magnetic tapes T in one recording processing has been described, but the present disclosure is not limited thereto. For example, the object recorded on the magnetic tape T on which the object is already recorded may be duplicated on another magnetic tape T to record the plurality of objects to be recorded on each of the plurality of magnetic tapes T. In this case, it is exemplified that the recorded object is recorded (duplicated) on another magnetic tape T in a hierarchy different from the group hierarchy in which the object is already recorded on the recorded magnetic tape T, as in the second embodiment.

In each of the above embodiments, the case where the user inputs the hierarchical relationship of the hierarchy of the group has been described, but the present disclosure is not limited thereto. For example, a group with a larger number included in the metadata of the plurality of objects to be recorded may have a higher hierarchy. For example, a group having a higher reading frequency in the past may have a higher hierarchy.

In each of the above embodiments, the case where the disclosed technique is applied to the object storage system has been described, but the present disclosure is not limited thereto. For example, the disclosed technique may be applied to a storage system having a hierarchical structure such as a directory.

In each of the above embodiments, the case where the medical data is applied as the data to be recorded on the magnetic tape T has been described, but the present disclosure is not limited thereto. For example, data for purposes other than medical use may be applied as the data to be recorded on the magnetic tape T.

In each of the above embodiments, for example, the following various processors can be used as hardware structures of processing units that execute various pieces of processing, such as the reception units 40 and 40A, the generation units 41 and 41A, the control units 42 and 42A, the reception unit 50, and the reading units 52 and 52A. As described above, the various processors include a programmable logic device (PLD) which is a processor whose circuit configuration is changeable after manufacturing such as an FPGA, a dedicated electric circuit which is a processor having a circuit configuration exclusively designed to execute specific processing such as an application specific integrated circuit (ASIC), and the like, in addition to the CPU which is a general-purpose processor that executes software (program) to function as various processing units.

One processing unit may be configured by one of the various processors or a combination of two or more processors of the same type or different types (for example, a combination of a plurality of FPGAs or a combination of a CPU and an FPGA). The plurality of processing units may be composed of one processor.

As an example of configuring the plurality of processing units with one processor, first, there is a form in which one processor is configured by a combination of one or more CPUs and software and the processor functions as the plurality of processing units, as represented by computers such as a client and a server. Second, there is a form in which a processor that realizes the functions of the entire system including the plurality of processing units with one integrated circuit (IC) chip is used, as represented by a system-on-chip (SoC) or the like. As described above, the various processing units are configured using one or more of the various processors as the hardware structure.

Further, more specifically, a circuitry combining circuit elements such as semiconductor elements can be used as the hardware structure of the various processors.

In each of the above embodiments, the form in which the recording program 30 and the reading program 32 are stored (installed) in the storage unit 22 in advance has been described, but the present disclosure is not limited thereto. The recording program 30 and the reading program 32 may be provided in a form of being recorded on a magnetic recording medium such as a CD-ROM, a digital versatile disc read only memory (DVD-ROM), and a Universal Serial Bus (USB) memory. The recording program 30 and the reading program 32 may be downloaded from an external device through a network.

EXAMPLES

Hereinafter, the present disclosure will be described based on Examples. However, the present disclosure is not limited to aspects shown in Examples. The "part" described below indicates "part by mass". Unless otherwise specified, steps and evaluations described below are performed in an environment with an ambient temperature of 23° C.±1° C. The "eq" described below is an equivalent and is a unit that cannot be converted into SI units. First, Examples of the magnetic recording medium will be described.

The projection forming agents used for manufacturing the magnetic recording media of Examples and Comparative Examples are as follows. A projection forming agent 1 and a projection forming agent 3 are particles having low surface smoothness on the particle surface. A particle shape of a projection forming agent 2 is a cocoon-like shape. A particle shape of a projection forming agent 4 is a so-called unspecified shape. A particle shape of a projection forming agent 5 is close to the true sphere.

Projection forming agent 1: ATLAS (composite particle of silica and polymer) manufactured by Cabot, average particle size 100 nm Projection forming agent 2: TGC6020N (silica particle) manufactured by Cabot, average particle size 140 nm Projection forming agent 3: Cataloid manufactured by JGC Catalysts and Chemicals (water dispersion sol of silica particle; use dry material, obtained by heating the water dispersion sol to remove a solvent, as a projection forming agent for preparing a projection forming agent liquid described below), average particle size 120 nm Projection forming agent 4: Asahi #50 (carbon black) manufactured by Asahi Carbon, average particle size 300 nm Projection forming agent 5: PL-10L manufactured by Fuso Chemical Industry (water dispersion sol of silica particle; use dry material, obtained by heating the water dispersion sol to remove a solvent, as a projection forming agent for preparing a projection forming agent liquid described below), average particle size 130 nm

Example 1

<Composition for Magnetic Layer Forming>
(Magnetic Liquid)
Ferromagnetic powder (hexagonal barium ferrite powder): 100.0 parts
(Coercivity Hc: 196 kA/m, average particle size (average plate diameter) 24 nm)
Oleic acid: 2.0 parts
Vinyl chloride copolymer (MR-104 manufactured by Kaneka): 10.0 parts
$SO_3Na$ group-containing polyurethane resin: 4.0 parts
(Weight-average molecular weight 70,000, $SO_3Na$ group: 0.07 meq/g)
Additive A: 10.0 parts
Methyl ethyl ketone: 150.0 parts
Cyclohexanone: 150.0 parts
(Abrasive Solution)
α-Alumina (average particle size: 110 nm): 6.0 parts
Vinyl chloride copolymer (MR110 manufactured by Kaneka): 0.7 parts
Cyclohexanone: 20.0 parts
(Projection Forming Agent Liquid)
Projection forming agent (refer to FIG. 14): 1.3 parts
Methyl ethyl ketone: 9.0 parts
Cyclohexanone: 6.0 parts
(Lubricant and Curing Agent Liquid)
Stearic acid: 3.0 parts
Stearic acid amide: 0.3 part
Butyl stearic acid: 6.0 parts
Methyl ethyl ketone: 110.0 parts
Cyclohexanone: 110.0 parts
Polyisocyanate (Coronate (registered trademark) L manufactured by Tosoh): 3.0 parts
The additive A is a polymer synthesized by a method described in paragraphs 0115 to 0123 of JP2016-051493A.

<Composition for Non-Magnetic Layer Forming>
Non-magnetic inorganic powder (α-iron oxide): 80.0 parts
(Average particle size: 0.15 μm, average needle-shaped ratio: 7, Brunauer-Emmett-Teller (BET) specific surface area: 52 $m^2/g$)
Carbon black (average particle size: 20 nm): 20.0 parts
Electron beam curable vinyl chloride copolymer: 13.0 parts
Electron beam curable polyurethane resin: 6.0 parts
Phenylphosphonic acid: 3.0 parts
Cyclohexanone: 140.0 parts
Methyl ethyl ketone: 170.0 parts
Butyl stearate: 2.0 parts
Stearic acid: 1.0 part <Composition for Back Coating Layer Forming>
Non-magnetic inorganic powder (α-iron oxide): 80.0 parts
(Average particle size: 0.15 μm, average needle-shaped ratio: 7, BET specific surface area: 52 $m^2/g$)
Carbon black (average particle size: 20 nm): 20.0 parts
Carbon black (average particle size: 100 nm): 3.0 parts
Vinyl chloride copolymer: 13.0 parts
Sulfonic acid group-containing polyurethane resin: 6.0 parts
Phenylphosphonic acid: 3.0 parts
Cyclohexanone: 140.0 parts
Methyl ethyl ketone: 170.0 parts
Stearic acid: 3.0 parts
Polyisocyanate (Coronate manufactured by Tosoh): 5.0 parts
Methyl ethyl ketone: 400.0 parts <Preparation of Composition for Each Layer Forming>
The composition for magnetic layer forming is prepared by the following method.

The kneading and dilution treatments are performed on components of the magnetic liquid with the open kneader, and then a dispersion treatment of 12 passes is performed, by a horizontal bead mill disperser, with a retention time per pass of 2 minutes at a bead filling percentage of 80% by volume and a rotor tip peripheral speed of 10 m/sec by using a zirconia ($ZrO_2$) bead having a particle size of 0.5 mm (hereinafter, referred to as "Zr bead").

Components of an abrasive solution are mixed, and then the abrasive solution is placed in a vertical sand mill disperser together with Zr beads having a particle size of 1 mm such that bead volume/(abrasive solution volume+bead volume) is adjusted to be 60%. After the adjustment, a sand mill dispersion treatment is performed for 180 minutes to take out the treated liquid and an ultrasonic dispersion filtration treatment is performed using a flow-type ultrasonic dispersion filtration device.

The magnetic liquid, the abrasive solution, the projection forming agent liquid, the lubricant, and the curing agent liquid are introduced into a dissolver stirrer, stirred at a peripheral speed of 10 m/sec for 30 minutes, then is subjected to the treatment of three passes at a flow rate of 7.5 kg/min with a flow-type ultrasonic disperser, and then is filtered by a filter having a pore diameter of 1 μm to prepare the composition for magnetic layer forming.

The composition for non-magnetic layer forming is prepared by the following method.

The kneading and dilution treatments are performed on the components excluding the lubricant (butyl stearate and stearic acid) with the open kneader, and then the dispersion treatment is performed by the horizontal bead mill disperser. Thereafter, the lubricant (butyl stearate and stearic acid) is added and a mixing treatment is performed by stirring the components with the dissolver stirrer to prepare the composition for non-magnetic layer forming.

The composition for back coating layer forming is prepared by the following method.

The kneading and dilution treatments are performed on the components excluding the lubricant (stearic acid), polyisocyanate, and methyl ethyl ketone (400.0 parts) with the open kneader, and then the dispersion treatment is performed by the horizontal bead mill disperser. Thereafter, the lubricant (stearic acid), polyisocyanate, and methyl ethyl ketone (400.0 parts) are added and the mixing treatment is performed by stirring the components with the dissolver stirrer to prepare the composition for back coating layer forming.

<Magnetic Tape Manufacturing>
The composition for non-magnetic layer forming is coated onto a polyethylene naphthalate support having a thickness of 6.0 μm such that a thickness after drying is 1.0 μm and is dried. Then, the electron beam at an acceleration voltage of 125 kV is irradiated such that the energy is 40 kGy. The composition for magnetic layer forming is coated onto the composition for non-magnetic layer forming such that the thickness after drying is 50 nm, and a vertical alignment treatment of applying a magnetic field with a magnetic field strength of 0.3 T to a surface of the coating layer while the coating layer is in a wet (undried) state is performed to dry the composition for magnetic layer forming. Further, the composition for back coating layer forming is coated onto a surface of the support opposite to a surface on which the non-magnetic layer and the magnetic layer are formed such that the thickness after drying is 0.5 μm and is dried.

Thereafter, calender treatment is performed at a calender speed of 80 m/min, a linear pressure of 294 kN/m, and a calender temperature shown in FIG. 14, using a seven-stage calender roll configured of only metal rolls. Thereafter, the heat treatment is performed for 36 hours in an environment with an ambient temperature of 70° C. After the heat treatment, slitting is performed with a width of ½ inch (1 inch=0.0254 m) and the magnetic layer surface is cleaned with a tape cleaning device attached to a device having a feeding and winding device for a slit product such that a non-woven fabric and a razor blade press against the magnetic layer surface to obtain the magnetic tape.

Examples 2 to 7 and Comparative Examples 1 to 9

The magnetic tape is obtained by the same method as in Example 1 except that the type of the projection forming agent and/or the calender temperature are changed as shown in FIG. 14. In FIG. 14, a case where the projection forming agent is "absent" represents that the projection forming agent is not used. In FIG. 14, a term "recording control" represents the presence or absence of recording control for data according to the present disclosure.

[Evaluation Method]

(1) Difference ($S_{0.5}-S_{13.5}$)

The spacing $S_{0.5}$ and $S_{13.5}$ after the n-hexane cleaning are measured by the following method using a tape spacing analyzer (TSA (manufactured by Micro Physics)), and the difference ($S_{0.5}-S_{13.5}$) is calculated from the measured values.

Five sample pieces having a length of 5 cm are cut out from each of the magnetic tapes of Examples and Comparative Examples, the n-hexane cleaning is performed on each sample piece by the method described above, and then $S_{0.5}$ and $S_{13.5}$ are measured by the following method.

In a state where a glass plate (glass plate (model number: WG10530) manufactured by Thorlabs, Inc.) provided in the TSA is disposed on the magnetic layer surface of the magnetic tape (that is, the sample piece), a hemisphere, which is made of urethane and provided in the TSA as the pressing member, is pressed against a surface of the back coating layer of the magnetic tape at a pressure of 0.5 atm. In this state, reflected light obtained by irradiating a certain area (150,000 to 200,000 μm$^2$) on the magnetic layer surface of the magnetic tape through the glass plate with white light from a stroboscope provided in the TSA is received by a charge-coupled device (CCD) through an interference filter (filter that selectively transmits light having a wavelength of 633 nm) to obtain the interference fringe image generated by unevenness in the area.

This image is divided into 300,000 points to obtain a distance of each point (spacing) from a surface of the glass plate on a magnetic tape side to the magnetic layer surface of the magnetic tape. With the obtained distance of each point as a histogram, the most frequent value in this histogram is obtained as the spacing $S_{0.5}$.

The same sample piece is further pressed, and the spacing $S_{13.5}$ is obtained by the same method as above under a pressure of 13.5 atm.

The difference ($S_{0.5}-S_{13.5}$) between $S_{0.5}$ and $S_{13.5}$ obtained as described above is calculated for the above five sample pieces, and an arithmetical mean of the calculated values is shown in FIG. 14 as the difference ($S_{0.5}-S_{13.5}$).

(2) Friction Coefficient (μ Value)

In an environment with an ambient temperature of 23° C. and a relative humidity of 50%, a magnetic head removed from a Linear Tape-Open Generation 5 (LTO (registered trademark) G5) drive manufactured by IBM is attached to a tape running system, an evaluation of data readout described below is performed while applying a tension of 0.6N (Newton), and the magnetic tape having a tape length of 20 m is cut out from the evaluated magnetic tape. The cut-out magnetic tape having the tape length of 20 m is caused to run at a running speed of 4.0 m/s while causing the magnetic layer surface and the magnetic head to be brought into contact with each other and to move slidingly, while performing feeding from a feeding roll and winding on a winding roll. In the running of a first pass, frictional force related to the magnetic head during the running is measured using a strain gauge, and to obtain a friction coefficient μ value from the measured frictional force. The value in FIG. 14 is the μ value obtained for the running of the first pass and thus indicated as "μ value (1p)".

[Evaluation of Data Readout]

A magnetic tape is prepared for the data readout evaluation. As the magnetic tape, Example 1 of the magnetic recording medium is used. A running condition of the magnetic tape is as follows.

Number of data per lap: 10
Evaluation area of magnetic tape for readout: 3 laps
Number of readout data: 5
Initial position of head: head of tape In regards to the seek of the head with respect to the magnetic tape, it is assumed that one unit time is required for each of (1) movement of one piece of data, (2) stop of header movement, and (3) switching of laps.

Figure 15:
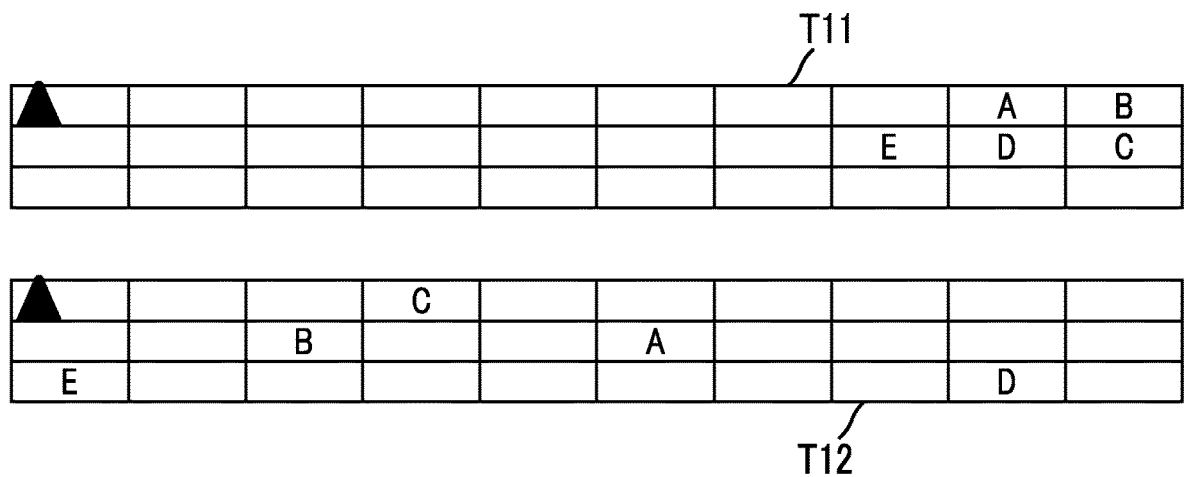
FIG. 15 is a diagram schematically showing an aspect of recording data of each magnetic tape.

For the evaluation, the magnetic tape in which the recording control for data according to the present disclosure is performed and the magnetic tape in which the data recording is randomly performed are prepared. In the magnetic tape in which the recording control for data according to the present disclosure is performed, all the data (five herein) included in the group of the highest hierarchy are recorded in the recording order according to the order from the upper hierarchy to the lower hierarchy. An aspect of recording the data of each magnetic tape is schematically shown in FIG. 15. In a magnetic tape T11 in which the recording control for data according to the present disclosure is performed, five pieces of data A to D are continuously recorded from a first lap to a second lap, as an example. In the case of the evaluation, a recording position of first data A is random. On the other hand, in a magnetic tape T12 in which the data is randomly recorded, five pieces of data A to D are randomly recorded. A triangle in FIG. 15 indicates a head position of recording and readout of the data.

For the magnetic tape T11, a time required to follow a shortest path for reading out five continuously recorded pieces of data is obtained. For the magnetic tape T12, a time required to follow a shortest path for reading out five randomly recorded pieces of data is obtained. The number of trials is 83,343.

Figure 16:
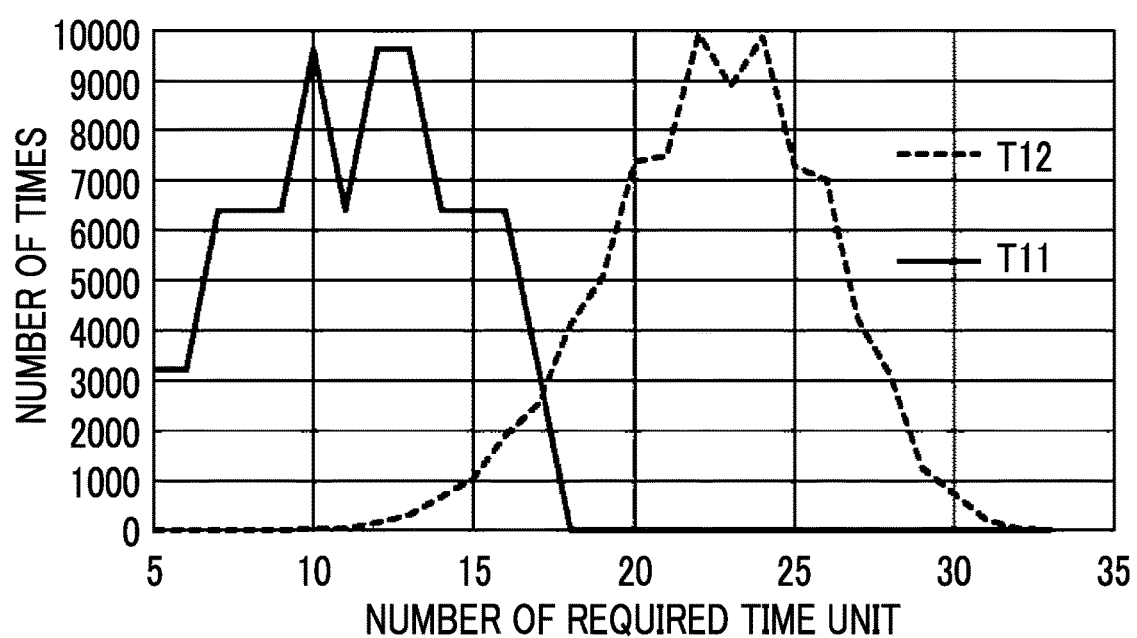
FIG. 16 is a graph showing results of Examples of the present disclosure.

FIG. 16 shows results of the evaluation of the data readout. An average required time is 11.27 unit times for the magnetic tape T11, and an average required time is 22.47 unit times for the magnetic tape T12.

From the result shown in FIG. 14, it can be confirmed that the magnetic tape of Examples has a smaller μ value than the magnetic tape of the Comparative Examples, that is, the increase in the friction coefficient is small even though the sliding with the magnetic head is repeated. From the results shown in FIG. 16, the average required time can be reduced by about 50% by using the present disclosure. Therefore, according to the present disclosure, it can be confirmed that the number of repeated reciprocations of the head required for the data readout can be reduced. In Examples of the present disclosure, the hexagonal barium ferrite powder is used as the ferromagnetic powder. However, even in a case where the hexagonal strontium ferrite powder and the ε-iron oxide powder are used as the ferromagnetic powder, it is confirmed that good results are obtained as in the case of using the hexagonal barium ferrite powder.

The average particle size of the hexagonal strontium ferrite powder used here is 19 nm, the activation volume is 1,102 nm$^3$, the anisotropy constant Ku is 2.0×10$^5$ J/m$^3$, and the mass magnetization αs is 50 A·m$^2$/kg. The anisotropic magnetic field Hk of the magnetic layer containing the hexagonal strontium ferrite powder is 25 kOe. Similarly, the average particle size of ε-iron oxide powder is 12 nm, the activation volume is 746 nm$^3$, the anisotropy constant Ku is 1.2×10$^5$ J/m$^3$, and the mass magnetization as is 16 A·m$^2$/kg. The anisotropic magnetic field Hk of the magnetic layer containing the ε-iron oxide powder is 30 kOe.

What is claimed is:

1. A recording device comprising at least one processor, wherein the processor is configured to:
   generate a hierarchy of a group that classifies each piece of data from information about each of a plurality of pieces of data to be recorded; and
   control recording of the plurality of pieces of data included in a group of the hierarchy at a highest level on a magnetic recording medium in a recording order according to an order from an upper hierarchy to a lower hierarchy, for each group of the hierarchy at the highest level,
   wherein the magnetic recording medium has a magnetic layer containing a ferromagnetic powder and a binding agent on a non-magnetic support, and
   a difference between a spacing $S_{0.5}$ measured under a pressure of 0.5 atm by an optical interference method after n-hexane cleaning on a surface of the magnetic layer and a spacing $S_{13.5}$ measured under a pressure of 13.5 atm by the optical interference method after the n-hexane cleaning on the surface of the magnetic layer, $S_{0.5}$–$S_{13.5}$, is equal to or less than 3.0 nm.

2. The recording device according to claim 1, wherein the difference is 1.5 nm or more and 3.0 nm or less.

3. The recording device according to claim 1, wherein $S_{0.5}$ is in a range of 5.0 to 50.0 nm.

4. The recording device according to claim 1, wherein the magnetic layer contains an inorganic oxide-based particle.

5. The recording device according to claim 4, wherein the inorganic oxide-based particle is a composite particle of an inorganic oxide and a polymer.

6. The recording device according to claim 1, wherein the magnetic layer contains one or more types of lubricants selected from the group consisting of a fatty acid, a fatty acid ester, and a fatty acid amide.

7. The recording device according to claim 1, further comprising:
   a non-magnetic layer containing a non-magnetic powder and a binding agent between the non-magnetic support and the magnetic layer.

8. The recording device according to claim 1, further comprising:
   a back coating layer containing a non-magnetic powder and a binding agent on a surface side of the non-magnetic support opposite to a surface side having the magnetic layer.

9. The recording device according to claim 1, wherein the magnetic recording medium is a magnetic tape.

10. The recording device according to claim 1, wherein the processor is configured to control the recording of the plurality of pieces of data on the magnetic recording medium with a single recording instruction.

11. The recording device according to claim 1, wherein in a case where the plurality of pieces of data are recorded on each of a plurality of the magnetic recording media,
   the processor is configured to generate a plurality of the hierarchies by making a hierarchical relationship of the hierarchy different corresponding to each of the plurality of magnetic recording media, and
   control the recording of the plurality of pieces of data on each of the plurality of magnetic recording media in the recording order according to each of the hierarchies generated by the generation unit.

12. The recording device according to claim 1, wherein processor is configured to receive information representing a hierarchical relationship of the hierarchy.

13. A reading device comprising at least one processor, wherein the processor is configured to:
   receive identification information of data to be read; and
   read the data according to the identification information from a magnetic recording medium on which a plurality of pieces of data included in a group of a hierarchy at a highest level are recorded in a recording order according to an order from an upper hierarchy to a lower hierarchy, for each group of the hierarchy at the highest level in the hierarchy of the group that classifies each piece of data, which is generated from information about each of the plurality of pieces of data,
   wherein the magnetic recording medium has a magnetic layer containing a ferromagnetic powder and a binding agent on a non-magnetic support, and
   a difference between a spacing $S_{0.5}$ measured under a pressure of 0.5 atm by an optical interference method after n-hexane cleaning on a surface of the magnetic layer and a spacing $S_{13.5}$ measured under a pressure of 13.5 atm by the optical interference method after the n-hexane cleaning on the surface of the magnetic layer, $S_{0.5}$–$S_{13.5}$, is equal to or less than 3.0 nm.

14. The reading device according to claim 13, wherein in a case where the data to be read is read from a plurality of the magnetic recording media on which the plurality of pieces of data are recorded in the recording order according to a plurality of the hierarchies having different hierarchical relationships,
   the processor is configured to read the data from the magnetic recording medium on which the data to be read is recorded in a highest hierarchy, among the plurality of magnetic recording media.

15. A recording method executed by a computer, the method comprising:
   generating a hierarchy of a group that classifies each piece of data from information about each of a plurality of pieces of data to be recorded; and
   controlling recording of the plurality of pieces of data included in a group of the hierarchy at a highest level on a magnetic recording medium in a recording order according to an order from an upper hierarchy to a lower hierarchy, for each group of the hierarchy at the highest level, wherein the magnetic recording medium has a magnetic layer containing a ferromagnetic powder and a binding agent on a non-magnetic support, and a difference between a spacing $S_{0.5}$ measured under a pressure of 0.5 atm by an optical interference method after n-hexane cleaning on a surface of the magnetic layer and a spacing $S_{13.5}$ measured under a pressure of 13.5 atm by the optical interference method after the n-hexane cleaning on the surface of the magnetic layer, $S_{0.5}$–$S_{13.5}$, is equal to or less than 3.0 nm.

16. A non-transitory computer-readable storage medium that stores a recording program causing a computer to execute generating a hierarchy of a group that classifies each piece of data from information about each of a plurality of pieces of data to be recorded; and controlling recording of the plurality of pieces of data included in a group of the hierarchy at a highest level on a magnetic recording medium in a recording order according to an order from an upper hierarchy to a lower hierarchy, for each group of the hierarchy at the highest level, wherein the magnetic recording medium has a magnetic layer containing a ferromagnetic powder and a binding agent on a non-magnetic support, and a difference between a spacing $S_{0.5}$ measured under a pressure of 0.5 atm by an optical interference method after n-hexane cleaning on a surface of the magnetic layer and a spacing $S_{13.5}$ measured under a pressure of 13.5 atm by the optical interference method after the n-hexane cleaning on the surface of the magnetic layer, $S_{0.5}$–$S_{13.5}$, is equal to or less than 3.0 nm.

17. A reading method executed by a computer, the method comprising:

receiving identification information of data to be read; and reading the data according to the identification information from a magnetic recording medium on which a plurality of pieces of data included in a group of a hierarchy at a highest level are recorded in a recording order according to an order from an upper hierarchy to a lower hierarchy, for each group of the hierarchy at the highest level in the hierarchy of the group that classifies each piece of data, which is generated from information about each of the plurality of pieces of data, wherein the magnetic recording medium has a magnetic layer containing a ferromagnetic powder and a binding agent on a non-magnetic support, and a difference between a spacing $S_{0.5}$ measured under a pressure of 0.5 atm by an optical interference method after n-hexane cleaning on a surface of the magnetic layer and a spacing $S_{13.5}$ measured under a pressure of 13.5 atm by the optical interference method after the n-hexane cleaning on the surface of the magnetic layer, $S_{0.5}$–$S_{13.5}$, is equal to or less than 3.0 nm.

18. A non-transitory computer-readable storage medium that stores a reading program causing a computer to execute receiving identification information of data to be read; and reading the data according to the identification information from a magnetic recording medium on which a plurality of pieces of data included in a group of a hierarchy at a highest level are recorded in a recording order according to an order from an upper hierarchy to a lower hierarchy, for each group of the hierarchy at the highest level in the hierarchy of the group that classifies each piece of data, which is generated from information about each of the plurality of pieces of data, wherein the magnetic recording medium has a magnetic layer containing a ferromagnetic powder and a binding agent on a non-magnetic support, and a difference between a spacing $S_{0.5}$ measured under a pressure of 0.5 atm by an optical interference method after n-hexane cleaning on a surface of the magnetic layer and a spacing $S_{13.5}$ measured under a pressure of 13.5 atm by the optical interference method after the n-hexane cleaning on the surface of the magnetic layer, $S_{0.5}$–$S_{13.5}$, is equal to or less than 3.0 nm.

19. A magnetic tape on which a plurality of pieces of data included in a group of a hierarchy at a highest level are recorded in a recording order according to an order from an upper hierarchy to a lower hierarchy, for each group of the hierarchy at the highest level in the hierarchy of the group that classifies each piece of data, which is generated from information about each of the plurality of pieces of data, the magnetic tape comprising:

a non-magnetic support; and a magnetic layer containing a ferromagnetic powder and a binding agent on the non-magnetic support, wherein a difference between a spacing $S_{0.5}$ measured under a pressure of 0.5 atm by an optical interference method after n-hexane cleaning on a surface of the magnetic layer and a spacing $S_{13.5}$ measured under a pressure of 13.5 atm by the optical interference method after the n-hexane cleaning on the surface of the magnetic layer, $S_{0.5}$–$S_{13.5}$, is equal to or less than 3.0 nm.

* * * * *